United States Patent
Homma

(10) Patent No.: US 8,730,493 B2
(45) Date of Patent: May 20, 2014

(54) IMAGE PROCESSING APPARATUS, METHOD OF CONTROLLING THE SAME, AND STORAGE MEDIUM

(75) Inventor: Takayuki Homma, Tokyo (JP)

(73) Assignee: Canon Kabushiki Kaisha (JP)

( * ) Notice: Subject to any disclaimer, the term of this patent is extended or adjusted under 35 U.S.C. 154(b) by 469 days.

(21) Appl. No.: 12/502,498

(22) Filed: Jul. 14, 2009

(65) Prior Publication Data

US 2010/0007908 A1 Jan. 14, 2010

(30) Foreign Application Priority Data

Jul. 14, 2008 (JP) .................................. 2008-182719

(51) Int. Cl.
*G06F 15/00* (2006.01)

(52) U.S. Cl.
USPC ......... 358/1.14; 358/1.15; 358/1.16; 715/769

(58) Field of Classification Search
None
See application file for complete search history.

(56) References Cited

U.S. PATENT DOCUMENTS

| | | | |
|---|---|---|---|
| 2003/0223795 A1* | 12/2003 | Gomi | 400/61 |
| 2004/0190060 A1* | 9/2004 | Funakawa et al. | 358/1.16 |
| 2005/0027825 A1 | 2/2005 | Hikawa et al. | |
| 2006/0224559 A1* | 10/2006 | Abiko | 707/1 |
| 2006/0268321 A1* | 11/2006 | Brack et al. | 358/1.15 |
| 2007/0109588 A1* | 5/2007 | Saijo et al. | 358/1.14 |
| 2009/0063493 A1* | 3/2009 | Fukata et al. | 707/9 |
| 2009/0113329 A1* | 4/2009 | Corona | 715/769 |
| 2009/0257078 A1* | 10/2009 | Sawada et al. | 358/1.14 |

FOREIGN PATENT DOCUMENTS

| | | | |
|---|---|---|---|
| JP | 10-083263 A | 3/1998 |
| JP | 2004-240944 A | 8/2004 |
| JP | 2004-287861 A | 10/2004 |
| JP | 2004-287862 A | 10/2004 |
| JP | 2004-288067 A | 10/2004 |

OTHER PUBLICATIONS

Japanese Office Action issued in counterpart application No. JP2008-182719, dated Dec. 18, 2012.
JP OA issued Sep. 3, 2013 for corres. JP 2008-182719.

* cited by examiner

*Primary Examiner* — Vincent Rudolph
*Assistant Examiner* — Helen Q Zong
(74) *Attorney, Agent, or Firm* — Rossi, Kimms & McDowell LLP

(57) ABSTRACT

An image processing apparatus which is capable of flow easily and efficiently resuming an interrupted processing. The image processing apparatus executes a processing flow for sequentially carrying out a plurality of processes. When execution of the processing flow is interrupted due to occurrence of a power failure, the image processing apparatus creates a recovery processing flow for carrying out yet-to-be-executed ones of the processes included in the processing flow, after restart of the image processing apparatus, and executes the created recovery processing flow.

6 Claims, 27 Drawing Sheets

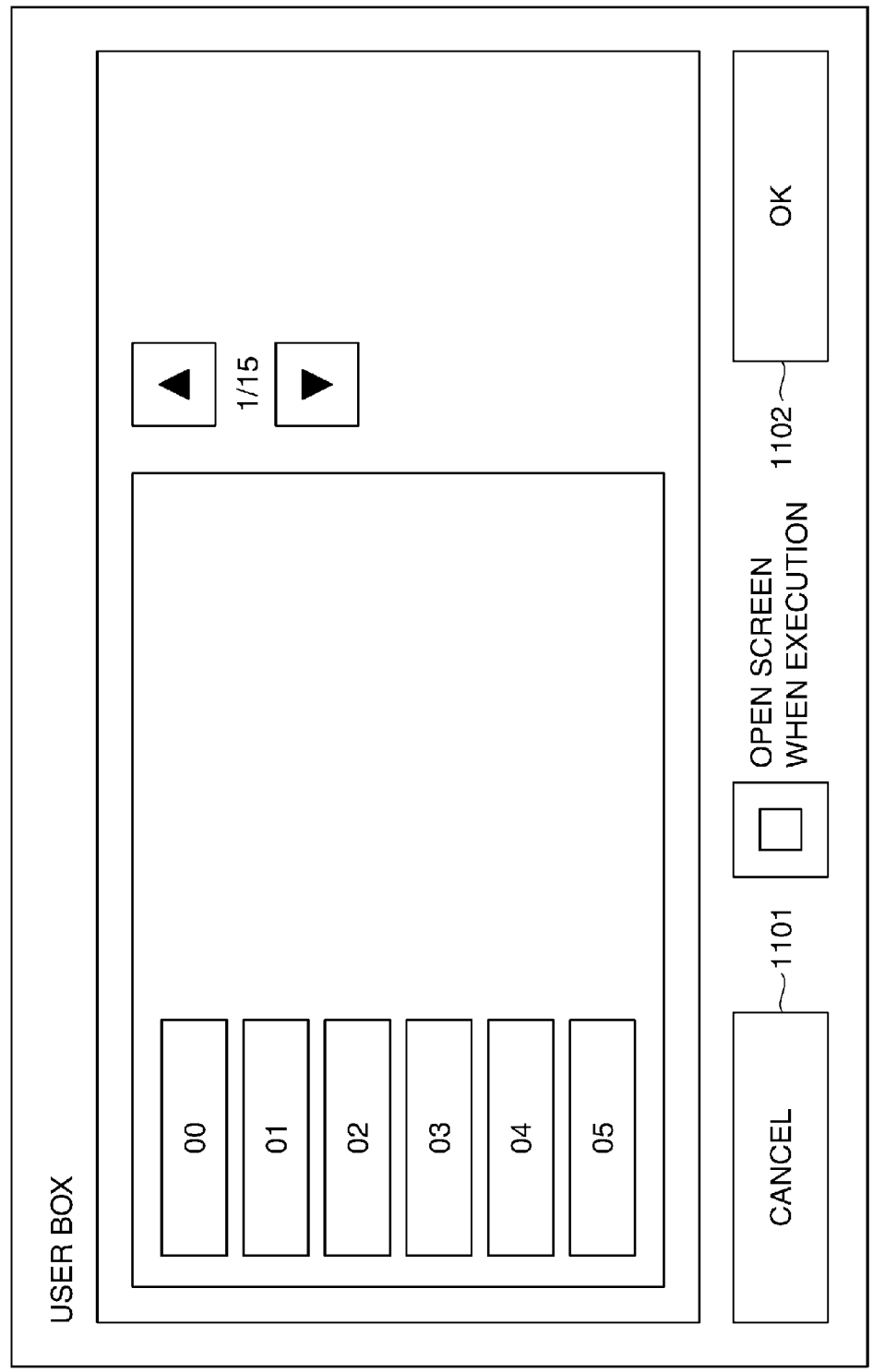

FIG. 14A

```
<?xml version=" 1.0" encoding=" UTF-8" ?>
<Workflow xmlns=" http://www.canon.com/ns/active/WorkflowComposer" id=9f9
84f42 -a41d-11dc-8000-000085adba68" owner-" 0000000" domain" " public="
shared" date=" 20071207020757" lastupdate=" 20071212041410" version=
1.0.4" devMacAdd=" ###00001" editToolVersion=" WfC V1.2.0"
buttonCaption="Caption" comment="Comment" temporaryBox=" 99" preview="
false" functionKind=" BoxScan,BoxDocument,CombineDocs,Print"
openScreenFlag=" false" >
<Function id=" BoxScan" no=" 1" >
<ExecScreenSetting>
<Screen id=" ClddExbFeedr" >true</Screen>
</ExecScreenSetting>
< ElementSetting>
<Element id=" E_SCAN_DENSITY" >
<Item id=" IT SCAN DENSITY TYPE" >AUTO</Item>
<Item id::" IT_DENSITY_VALUE" >8</Item>
</Element>
</ElementSetting>
```

FIG. 14B

```
</Function>
<Function id=" BoxDocument" no=" 3" >
<ElementSetting>
<Element id=" E_SELECTDOCHANDLE" >
<Item id=" IT_BOX_NO" >1 </Item>
</Element>
<Element id=" E_DOCHANDLE" >
<Item id=" doc_0" >-1073741824</Item>
</Element>
</ElementSetting>
</Functlon>
<Function id=" CombineDocs" no=" 4" >
<ExecScreenSetting>
<Screen id=" ClddDocUnlte" >false</Screen>
</ExecScreenSetting>
< ElementSetting>
<Element id=" E UNITE DOC" >
<Item id=" IT DOC NAME" >FC 3ffd1a00a81d11dc8000</Item>
<Item id="' IT_DOC_ORDER" >BOX_DOC</Item>
<Item id=" doc 0" >-1073741824</Item>
<Item id=" doc 1" >BOX SCAN DOC HANDLE</Item>
</Element>
</ElementSetting>
```

FIG. 14C

```
</Function>
<Function id=" Print" no=" 9" >
<ExecScreenSetting>
<Screen id="' ClddExePring'" >true</Screen>
</ExecScreenSetting>
<ElementSetting>
<Element id=" E DEFAULT PRINT" >
<Item id=" IT_DEFAULT_PRINT" >true</Item>
</Element>
<Element id=" E PAPER SELECT" >
<Item id=" IT DRAWER_TYPE" >AUTO</Item>
<Item id="' IT SELECT DRAWER'" >DRAWER 1 </Item>
</Element>
<Element id=" E_COPIES" >
<Item id=" IT COPIES" >1 </Item>
</Element>
</ElementSetting>
</Functlon>
</Workflow>
```

FIG.15

```
<?xml version=" 1.0" encoding=" UTF-8" ?>
<ExecFunctionflow id=" 9f984f42-a41d-11dc-8000-000085adba68" temporaryBox=" 99" >
<ExecFunction>BoxScan</ExecFunction>
<Executioner>
<name>user1</name>
<domain>test</domain>
</Executioner>
</ExecFunctionflow>
```

IMAGE PROCESSING APPARATUS, METHOD OF CONTROLLING THE SAME, AND STORAGE MEDIUM

BACKGROUND OF THE INVENTION

1. Field of the Invention

The present invention relates to an image processing apparatus, a method of controlling the same, and a storage medium storing a program for implementing the method, and more particularly to an image processing apparatus configured to create a processing flow for executing a series of processes and serially execute the processes according to the processing flow.

2. Description of the Related Art

Conventionally, there has been proposed a multifunction peripheral having a scanner function, a printer function, a facsimile transmission function, an e-mail transmission function, and a file transmission function in an integrated fashion. The use of this type of multifunction peripheral makes it possible to link paper-based paperwork carried out using a copying machine or a facsimile machine and processing of an electronic document on a computer. Specifically, it is possible not only to copy a paper document, but also to transmit a scanned document as image data to a personal computer or a file server without printing out the same.

Further, it is desired that after converting a paper document into electronic form, lots of procedures and processes to be executed on the electronic document by a copying machine are automatically performed by linking the electronic document to the procedures and processes. To this end, there has been proposed a technique in which a link template describing desired settings for items to be set by a copying machine is prepared in advance, and processing is performed by designating the template and after modifying settings as required.

For example, a conventional image forming apparatus is capable of storing a plurality of output configuration data items (link templates) for setting respective output forms, and forming and outputting an image according to a selected one of the output configuration data items (see e.g. Japanese Patent Laid-Open Publication No. H10-83263).

Further, there has been proposed a technique of causing an image forming apparatus of the above-mentioned type not only to configure settings for its own functions, but also to configure settings of external apparatuses, such as a printer and a scanner, connected to a network, and association with the external apparatuses, to thereby link processes by the image forming apparatus itself and processes by the external apparatuses (i.e. to create a processing flow) (see e.g. Japanese Patent Laid-Open Publication No. 2004-287861).

However, according to the above-mentioned techniques, once an error has occurred during execution of a processing flow, causing interruption of a series of processes, it is impossible to automatically restart the processing flow even after recovery from the error. Therefore, in order to complete the series of processes, the user is required to accurately determine where in the processing flow the error occurred, and manually cause the processing flow to be resumed from the interrupted point, or to execute the whole processing flow again from the very beginning, which is inconvenient to the user.

SUMMARY OF THE INVENTION

The present invention provides an image processing apparatus which is capable of easily and efficiently resuming an interrupted processing flow from an interrupted point, thereby enhancing user friendliness, a method of controlling the image processing apparatus, and a storage medium storing a program for implementing the method.

In a first aspect of the present invention, there is provided an image processing apparatus comprising an execution unit configured to execute a processing flow for sequentially carrying out a plurality of processes, and a recovery processing flow creation unit configured to be operable when execution of the processing flow is interrupted, to create a recovery processing flow for carrying out yet-to-be-executed ones of the processes included in the processing flow, wherein the execution unit executes the recovery processing flow created by the recovery processing flow creation unit.

In a second aspect of the present invention, there is provided a method of controlling an image processing apparatus, comprising executing a processing flow for sequentially carrying out a plurality of processes, creating a recovery processing flow for carrying out yet-to-be-executed ones of the processes included in the processing flow, when execution of the processing flow is interrupted, and executing the created recovery processing flow.

In a third aspect of the present invention, there is provided a computer-readable storage medium storing a program for causing a computer to execute a method of controlling an image processing apparatus, wherein the method comprises executing a processing flow for sequentially carrying out a plurality of processes, creating a recovery processing flow for carrying out yet-to-be-executed ones of the processes included in the processing flow, when execution of the processing flow is interrupted, and executing the created recovery processing flow.

According to the present invention, it is possible to easily and efficiently resume an interrupted processing flow from an interrupted point, to thereby enhance user friendliness.

The features and advantages of the invention will become more apparent from the following detailed description taken in conjunction with the accompanying drawings.

BRIEF DESCRIPTION OF THE DRAWINGS

FIG. 11 is a view of a box document process configuration screen displayed on the LCD display section when a "box document" button appearing in FIG. 10 is pressed.

FIGS. 14A-14C show an example of processing flow information stored in an XML file.

FIG. 15 shows an example of processing flow execution management information stored in the XML file.

DETAILED DESCRIPTION OF THE EMBODIMENTS

The present invention will now be described in detail below with reference to the accompanying drawings showing an embodiment thereof.

First, a description will be given of an image processing apparatus according to the embodiment of the present invention. The image processing apparatus executes an application described hereinafter.

Figure 1:
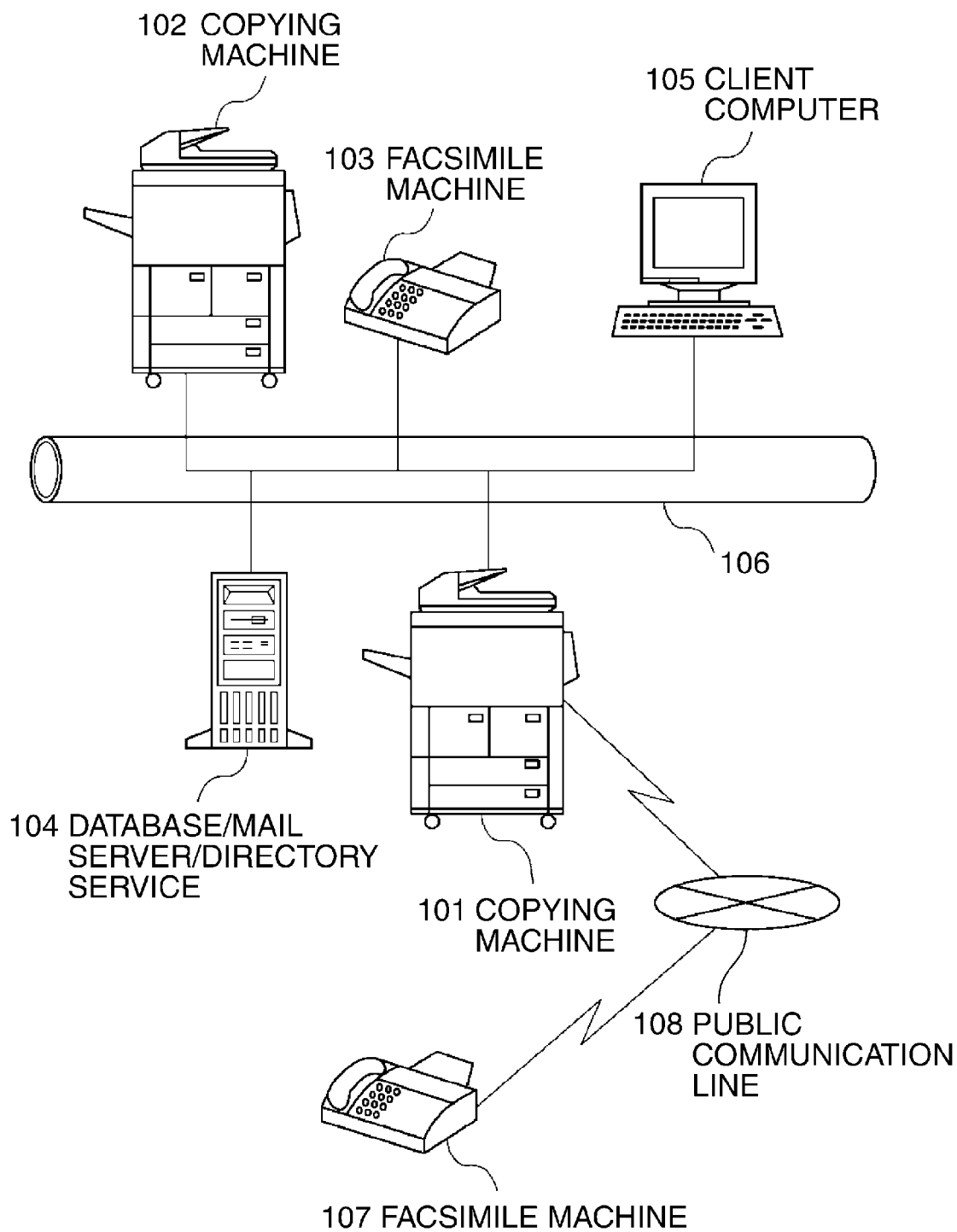
FIG. 1 is a diagram of a network including an image processing apparatus according to an embodiment of the present invention.

FIG. 1 is a diagram of a network including the image processing apparatus according to the present embodiment. In the present embodiment, a copying machine as an example of the image processing apparatus has a data transmission and reception function.

As shown in FIG. 1, the copying machine 101 as the image processing apparatus according to the present embodiment is connected to a LAN 106 such as an Ethernet (registered trademark), to which are also connected a copying machine 102 having functions equivalent to those of the copying machine 101, a facsimile machine 103, a database/mail server/directory service 104, and a client computer 105.

Further, the copying machine 101 is connected to a public communication line 108 together with a facsimile machine 107.

The copying machine 101 is provided with a copy function and a facsimile transmission function, as well as a scanning function of reading original images and a data transmission function of transmitting image data obtained by the scanning function to devices on the LAN 106.

The copying machine 101 conforms to the PDL (Page Description Language) (i.e. the copying machine 101 has a PDL print function), so that it can receive PDL data from a computer connected to the LAN 106 and print the data. Further, the copying machine 101 is capable of storing images read by itself and PDL data sent from computers connected to the LAN 106 in a box area in a hard disk drive (HDD) 204 (FIG. 2) of the copying machine 101, as well as capable of printing the images stored in the box area and sending the images. The box area is a storage area provided in the hard disk drive (HDD) 204, for storage of image data or the like. In the present embodiment, it is assumed that the hard disk drive (HDD) 204 can have a plurality of box areas.

The copying machine 101 is also capable of receiving, via the LAN 106, image data read by the copying machine 102 and storing the received data in the HDD 204 of the copying machine 101 and/or printing out the same. Further, the copying machine 101 is capable of receiving image data from the database/mail server/directory service 104 via the client computer 105 and the LAN 106, and storing the image data in the copying machine 101 and/or printing out the same. The facsimile machine 103 is capable of receiving image data read by the copying machine 101 via the LAN 106 and transmitting the received image data.

The database/mail server/directory service 104 is capable of receiving image data read by the copying machine 101, via the LAN 106, and storing the received image data for a database. The database/mail server/directory service 104 is also a server apparatus having a function of transmitting the received image data as an electronic mail and a function of providing directory services.

The client computer 105 is capable of accessing the database/mail server/directory service 104 to acquire desired data from the database/mail server/directory service 104, and displaying the data. Further, the client computer 105 is capable of receiving image data read by the copying machine 101, via the LAN 106, and processing or editing the received image data, as well as capable of accessing the copying machine 101 via the LAN 106 to configure various settings for the copying machine 101.

The facsimile machine 107 is capable of receiving image data read by the copying machine 101 via the public communication line 108 and printing out the received image data.

Figure 2:
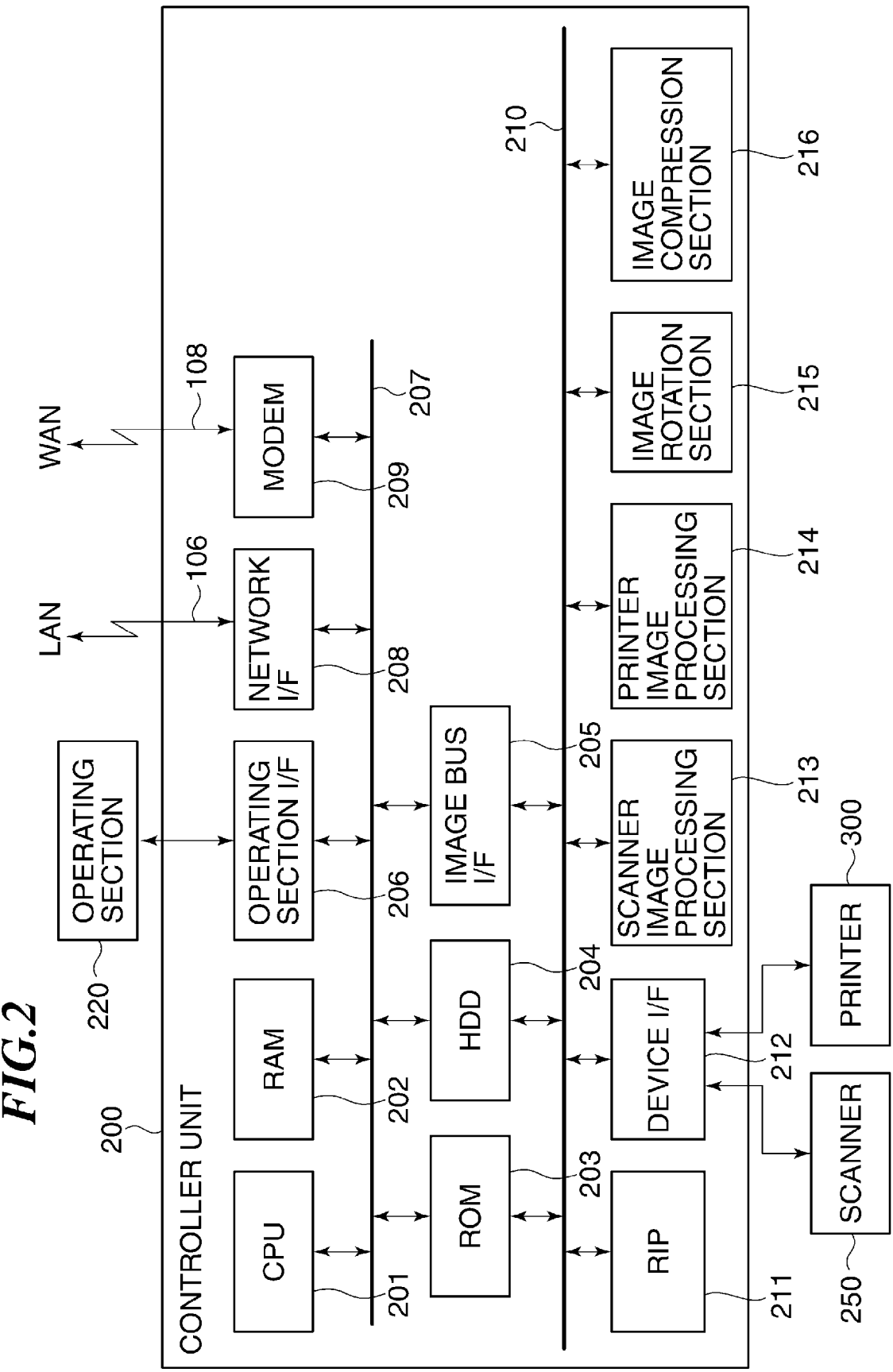
FIG. 2 is a block diagram of essential parts of a copying machine appearing in FIG. 1.

FIG. 2 is a block diagram of essential parts of the copying machine 101 appearing in FIG. 1.

As shown in FIG. 2, the copying machine 101 includes a controller unit 200. Connected to the controller unit 200 is a scanner 250 as an image input device and a printer 300 as an image output device, as well as an operating section 220. The controller unit 200 provides control for realizing a copy function of printing out image data read by the scanner 250, using the printer 300, as well as control for input and output of image information and device information via the LAN 106 and the public communication line (WAN) 108.

Specifically, the controller unit 200 includes a CPU 201, which starts up an operating system (OS) by a boot program stored in a ROM 203, and executes application programs stored in the HDD 204 on the OS to thereby carry out various operations. A RAM 202 is used as a work area for the CPU 201. The RAM 202 is used by the CPU 201 not only as the work area, but also as an image memory area for temporarily storing image data. The HDD 204 stores the above-mentioned application programs and image data.

Connected to the CPU 201 via a system bus 207 are not only the ROM 203 and the RAM 202 but also an operating section interface (operating section I/F) 206, a network interface (network I/F) 208, a modem 209, and an image bus interface (image bus I/F) 205.

The operating section I/F 206 provides interface for communication with the operating section 220, and image data to be displayed on the operating section 220 is output to the operating section 220. Further, the operating section I/F 206 transfers data input by a user via the operating section 220 to the CPU 201.

The network I/F 208 is connected to the LAN 106 to transmit and receive information to and from devices on the LAN 106 via the LAN 106. The modem 209 is connected to the WAN 108 to transmit and receive information via the WAN 108.

The image bus I/F 205 is a bus bridge that connects the system bus 207 with an image bus 210 that is for use in high-speed transfer of image data, and performs conversion of data format. The image bus 210 is implemented by a PCI bus or an IEEE 1394. On the image bus 210, there are provided a raster image processor (hereinafter referred to as "the RIP") 211, a device interface (device I/F) 212, a scanner image processing section 213, a printer image processing section 214, an image rotation section 215, and an image compression section 216.

The RIP 211 is a processor that expands PDL data into a bitmap image. The device I/F 212 is connected to the scanner 250 and the printer 300, and performs conversion of image data. The scanner image processing section 213 corrects, manipulates, and edits input image data. The printer image processing section 214 performs correction, resolution conversion, etc. of image data to be printed out, so as for the image data to conform to the printer 300. The image rotation section 215 rotates image data. The image compression section 216 compresses multi-valued image data into JPEG data, and binary image data into JBIG, MMR, or MH-formatted data, as well as performs expansion of the compressed data.

Next, a description will be given of the hardware configuration of the scanner 250 and that of the printer 300.

Figure 3:
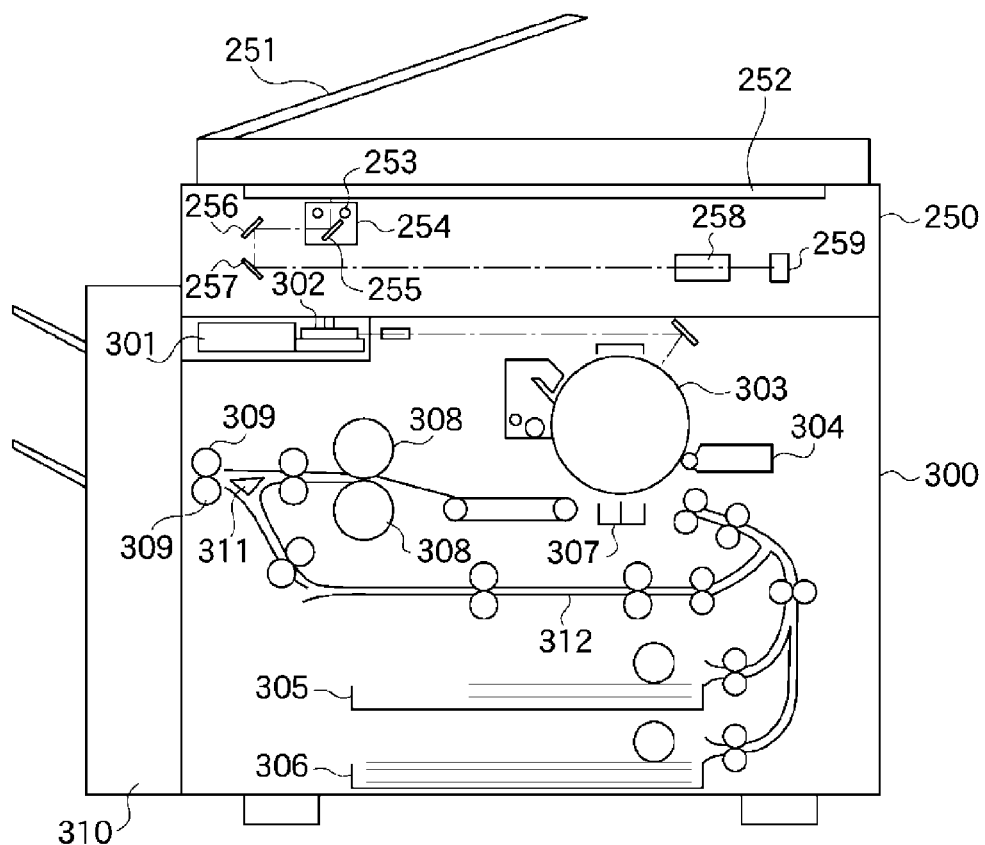
FIG. 3 is a schematic cross-sectional view useful in explaining the hardware configuration of a scanner and that of a printer appearing in FIG. 2.

FIG. 3 is a schematic cross-sectional view useful in explaining the hardware configuration of the scanner 250 and that of the printer 300 appearing in FIG. 2.

The scanner 250 and the printer 300 are integrally configured as shown in FIG. 3. The scanner 250 has a document feeder unit 251 provided thereon. In the document feeder unit 251, originals are sequentially fed one by one from the leading page onto a platen glass 252, and whenever an operation of reading an original is completed, the original is discharged from the platen glass 252 onto a discharge tray, not shown. When the original is fed onto the platen glass 252, the scanner 250 turns on a lamp 253 and causes a moving unit 254 to start moving. By the motion of the moving unit 254, scanning is performed to read the original on the platen glass 252. During the scanning, reflected light from the original is guided through mirrors 255, 256, and 257, and a lens 258 to a CCD 259 as an image sensor, and the image on the original is formed on the image pick-up surface of the CCD 259. The CCD 259 converts the image formed on the image pick-up surface into an electric signal. The electric signal is subjected to predetermined processing, followed by being input to a control device, not shown.

The printer 300 is provided with a laser driver 301. The laser driver 301 drives a laser emission section 302 based on the image data input from the control device. The laser emission section 302 generates and emits a laser beam according to the image data, which is irradiated onto a photosensitive drum 303 to scan the same. On the photosensitive drum 303, an electrostatic latent image is formed according to the irradiated laser beam, and this electrostatic latent image is visualized as a toner image by toner supplied from a development device 304. In timing synchronous with the irradiation of the laser beam, a recording sheet is fed from one of cassettes 305 and 306 into a space between the photosensitive drum 303 and a transfer section 307 through a predetermined conveying passage, and the toner image on the photosensitive drum 303 is transferred onto the recording sheet fed by the transfer section 307.

The recording sheet having the toner image transferred thereon is conveyed by a conveyer belt to a fixing roller pair 308 formed by a heating roller and a pressing roller. The fixing roller pair 308 fixes the toner image on the recording sheet by heating the recording sheet under pressure. After passing through the fixing roller pair 308, the recording sheet is discharged into a discharge unit 310 by a discharge roller pair 309. The discharge unit 310 is implemented by a sheet processing apparatus capable of performing post-processing, such as sorting and stapling.

When the copying machine 101 is set to a double-sided printing mode, the recording sheet is conveyed to the discharge roller pair 309, and then the direction of rotation of the discharge roller pair 309 is reversed such that the recording sheet is guided to a re-feeding conveying passage 312 by a flapper 311. The recording sheet guided to the re-feeding conveying passage 312 is re-fed to the space between the photosensitive drum 303 and the transfer section 307 in the same timing as described above, whereby a toner image is transferred onto the back side of the recording sheet.

Next, a description will be given of the operating section 220.

Figure 4:
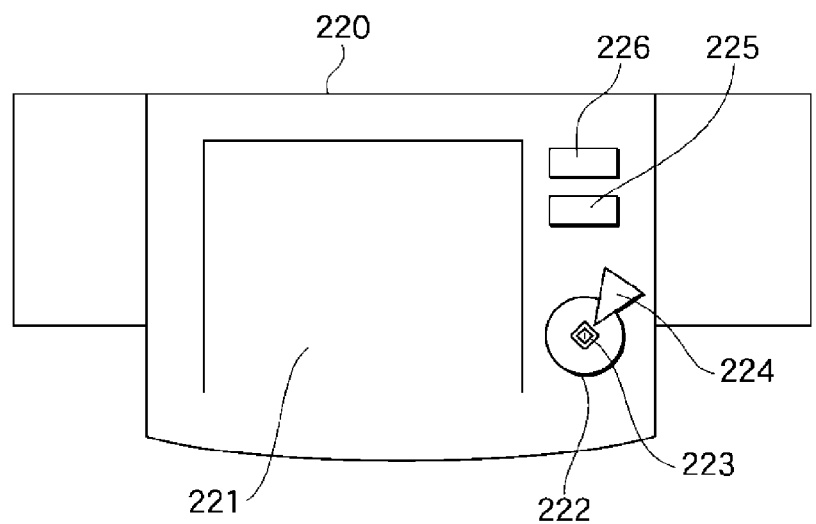
FIG. 4 is a schematic plan view of an operating section appearing in FIG. 2.

FIG. 4 is a schematic plan view of the operating section 220 appearing in FIG. 2.

As shown in FIG. 4, an LCD display section 221 is comprised of an LCD and a touch panel sheet attached thereto. The LCD display section 221 displays an operation screen for the copying machine 101, and when a touch key displayed on the screen is pressed, the LCD display section 221 transmits position information of the touch key to the CPU 201 of the controller unit 200. A start key 222 is used e.g. for starting an operation of reading an original image. In the center of the start key 222, there is provided a two-color LED 223 which emits a green light or a red light to indicate whether or not a function set by pressing the start key 222 is available. A stop key 224 is operated to stop a current operation. An ID key 225 is used to enter the user ID of a user. A reset key 226 is used to initialize settings entered via the operating section 220.

Figure 5:
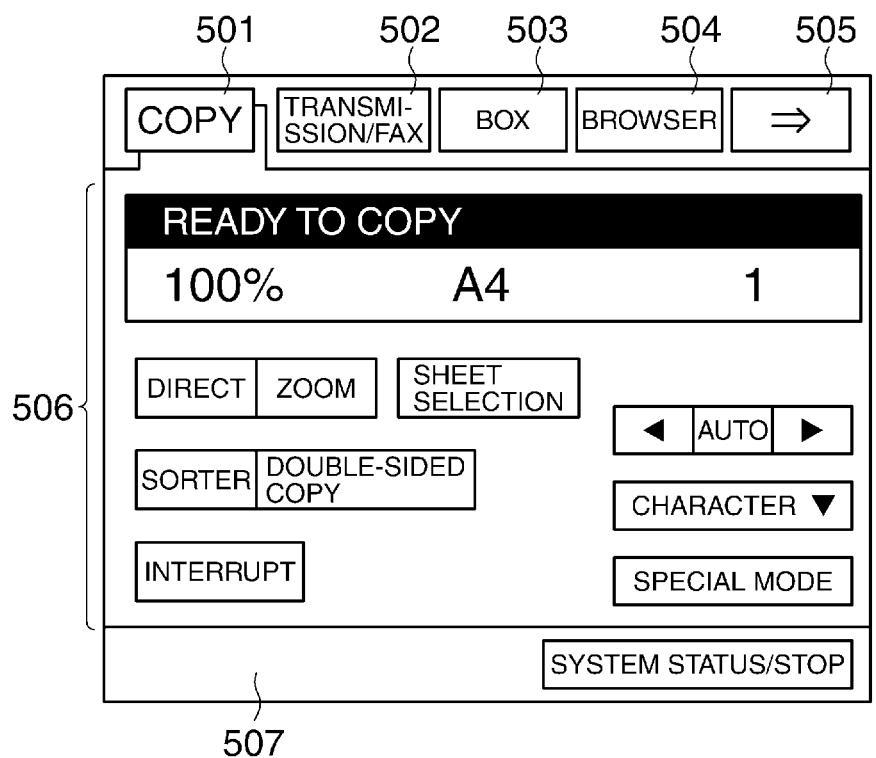
FIG. 5 is a view of an example of an operation screen displayed on an LCD display section appearing in FIG. 4.

FIG. 5 is a view of an example of an operation screen displayed on the LCD display section 221 appearing in FIG. 4.

As shown in FIG. 5, in the uppermost part of the operation screen on the LCD display section 221, function tabs are displayed for use as touch keys for selecting one of various functions provided by the copying machine 101. These function tabs include a copy tab 501, a transmission/fax tab 502, a box tab 503, a browser tab 504, and a right arrow tab 505, for example.

FIG. 5 shows an initial screen for making the copy function-related settings, which is displayed when the copy tab 501 is pressed. Display associated with the copy function is provided in an area 506. In a top portion of the area 506, a status message relating to the copy function such as "Ready to copy" is displayed. In a portion immediately below the top portion, a magnification/reduction ratio, a selected sheet feed cassette, and the number of copies are displayed. In a portion further below, as touch keys for the copy function-related settings, there are displayed a direct key, a zoom key, a sheet selection key, a sorter key, a double-sided printing key, an interrupt key, a character key, a left arrow key for adjustment of reducing print density, a right arrow key for adjustment of increasing print density, an auto key for automatic adjustment of print density, and a special mode key. Screens for displaying items of copy function-related settings that cannot be displayed on the initial screen are hierarchically displayed in the area 506 in response to pressing of the special mode key.

A status display area 507 displays a status of the copying machine 101. For example, an alarm message indicating occurrence of jamming, or a status message indicating that printing is being carried out in a PDL format is displayed. Further, in the status display area 507, a system status/stop key 508 is displayed. By pressing the system status/stop key 508, it is possible to stop or abort a job that is currently in process, on the screen shown in FIG. 5. If necessary, it is possible to display a screen, not shown, for displaying device information on the copying machine 101 or a screen, not shown, for displaying the progress of a print job currently executed.

When the transmission/fax tab 502 is pressed, a setup screen, not shown, is displayed for transmitting an image read by the copying machine 101 to an apparatus on the LAN 106 by e-mail or FTP transmission, or by facsimile transmission using the WAN 108.

When the box tab 503 is pressed, a setup screen, not shown, is displayed for storing an image read by the copying machine 101 in the box area of the HDD 204, or for designating image data stored in the box area to print out the same or transmit the same to an apparatus on the LAN 106.

In the case the copying machine 101 is provided with five or more functions, the right arrow tab 505 is displayed to the right of the four function tabs 501 to 504, i.e., the copy, transmission/fax, box, and browser tabs, and when the right arrow tab 505 is pressed, a screen for another function is displayed.

Next, a description will be given of the application executed by the copying machine as the image processing apparatus according to the present embodiment.

This application is realized by execution of an application program stored in the HDD (hard disk drive) by the CPU of the copying machine.

The application contributes to enhancement of efficiency in a routine carried out using copier functions. A processing flow is created by combining copier functions and registered so that the same settings can be repeatedly used. For example, a series of operations of reading originals and combining the read document and a document stored in the box area for being printed to form a cover can be set as one processing flow. It should be noted that in the present embodiment, a "document" includes image data obtained by reading an original.

One processing flow is comprised of three processes, i.e. an "input" process, an "editing" process, and an "output" process.

In the input process, a mode of inputting a document to be processed in the processing flow is set. In this case, an "original reading" mode or a "box document" mode can be selectively set.

When the "original reading" mode is set, it is possible to read originals according to read settings set for execution of the processing flow, and select the read originals as an input document. When the "box document" mode is set, it is possible to select a document stored in the box area as an input document.

In the editing process, a mode of editing a document selected in the input process is set. In this case, a "document combining" mode, a "page deletion" mode, or an "image display" mode can be selectively set.

When the "document combining" mode is set, it is possible to combine a plurality of documents selected in the input process in a designated order. When the "page deletion" mode is set, it is possible to erase designated pages of a document selected in the input process or documents connected in the editing process. When the "image display" mode is set, it is possible to display the image of a document selected in the input process or a document edited in the editing process.

In the output process, a mode of outputting a document selected in the input process or a document edited in the editing process is set. In this case, a "box storage" mode, a "transmission" mode, or a "print" mode can be selectively set.

When the "box storage" mode is set, it is possible to store a document selected in the input process or a document edited in the editing process in a designated box area. When the "transmission" mode is set, it is possible to transmit a document selected in the input process or a document edited in the editing process in a designated mode. When the "print" mode is set, it is possible to print a document selected in the input process or a document edited in the editing process, in designated settings.

Then, a created processing flow is stored in the XML format. The processing flow is displayed as a button on the operating section 220. When the processing flow button is pressed, the controller unit 200 of the copying machine 101 reads processing flow information from the XML file and executes associated processes while interpreting the details of the processing flow.

When an error occurs during execution of a processing flow, making it impossible to continue execution of the processing flow, the controller unit 200 can create a recovery processing flow as a processing flow for resuming (continuing) the interrupted processing flow. Further, even when execution of a processing flow is interrupted e.g. due to power failure and the application is forcibly terminated without creation of a recovery processing flow, it is possible to create the recovery processing flow after restart of the application. For example, after the power of the copying machine 101 is turned on again and the copying machine 101 is completely restarted, the controller unit 200 creates the recovery processing flow.

Further, the copying machine as the image processing apparatus according to the present embodiment executes a processing flow creation process and a processing flow execution process, described hereinafter, on the above-mentioned application.

Next, a description will be given of the processing flow creation process executed by the copying machine according to the present embodiment.

Figure 6:
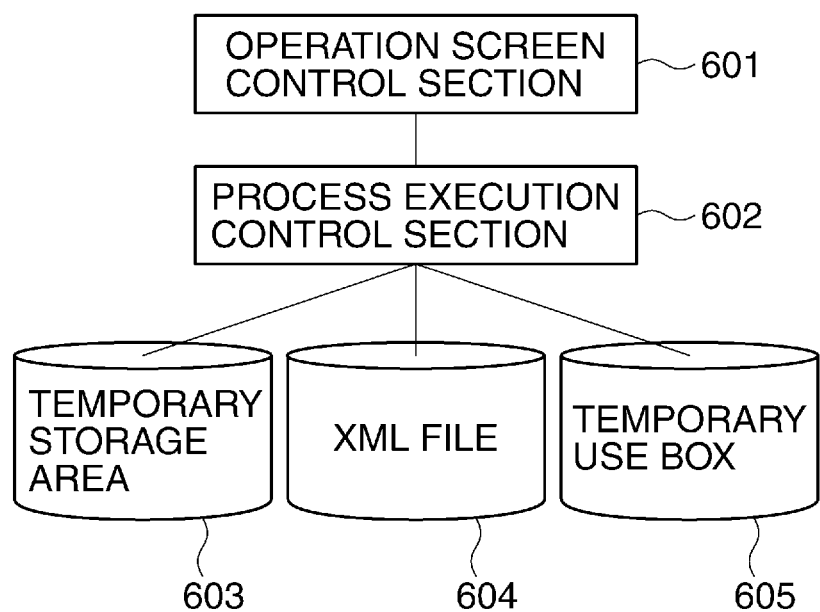
FIG. 6 is a block diagram showing the configuration of an application executed by the copying machine as the image processing apparatus according to the embodiment.

FIG. 6 is a block diagram showing the configuration of the application to be executed by the copying machine.

Referring to FIG. 6, an operation screen control section 601 is a program for displaying operation screens of the application on the LCD display section 221.

A process execution control section 602 (a first creation unit, a second creation unit, and a third creation unit) is a program for controlling the processing flow creation process and the processing flow execution process of the application based on information input by the user. It should be noted that a processing flow is a routine of business operations created and registered by configuring the order of execution of a plurality of copier functions and settings associated with the copier functions.

A temporary storage area 603 is an application work area secured in the RAM 202.

An XML file 604 is an XML-formatted file in which are written application configuration information and processing flow information stored in the HDD 204.

A temporary use box 605 is a box area provided in the HDD 204 so as to temporarily store image data generated by the application during execution of a processing flow.

Figure 7:
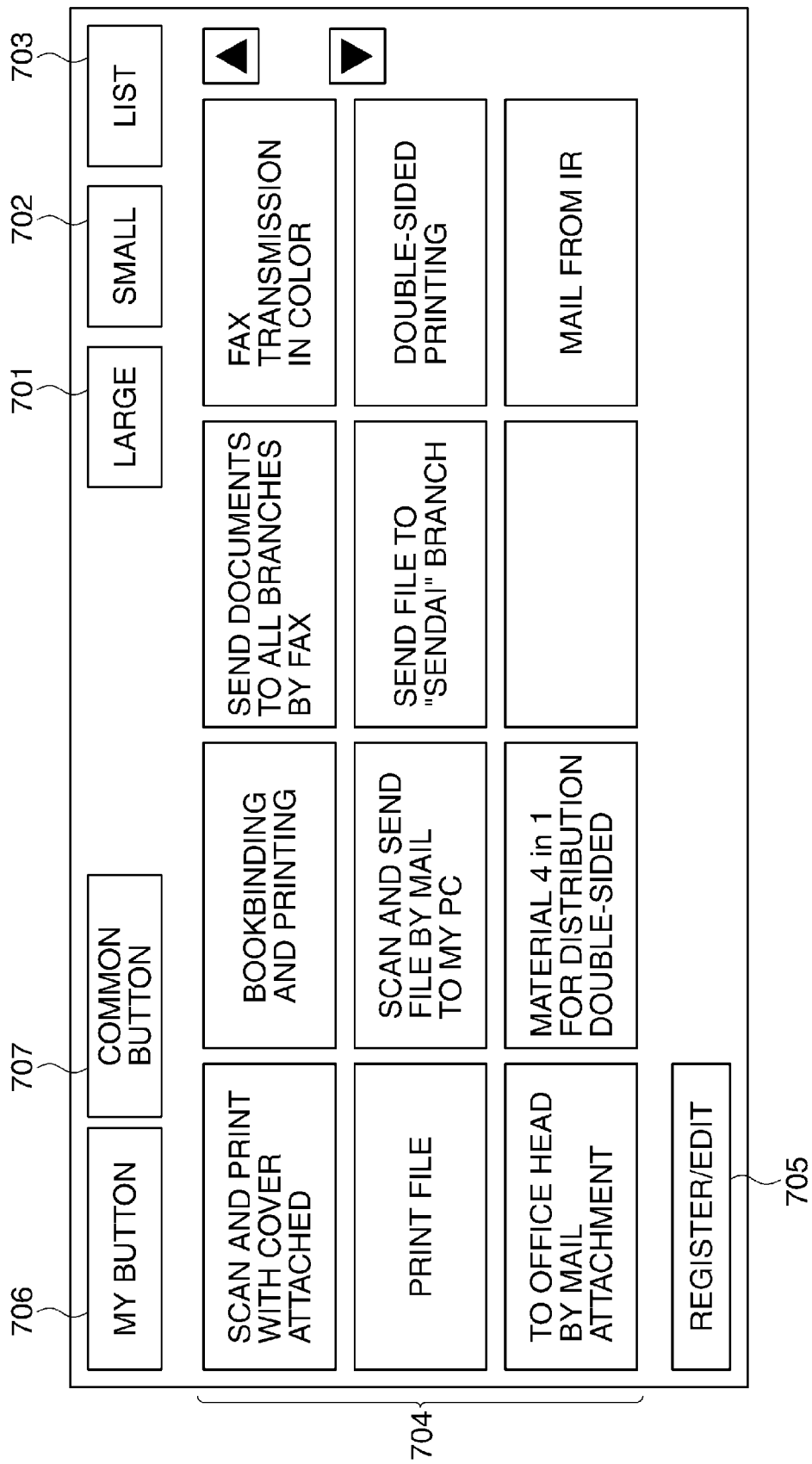
FIG. 7 is a view of an operation screen initially displayed on the LCD display section when an application is executed by the copying machine.

FIG. 7 is a view of an operation screen initially displayed on the LCD display section 221 when the application is executed by the copying machine as the image processing apparatus according to the present embodiment.

Referring to FIG. 7, a processing flow button group 704 is comprised of buttons that provide images indicative of respective processing flow information items stored in the XML file 604. When a selected one of the buttons of the processing flow button group 704 is pressed, a processing flow information item stored in the XML file 604 in association with the pressed button is read, and an associated copier function is executed according to the settings. Copier functions that can be set will be described in detail hereinafter. The display mode of the processing flow button group 704 is switched between three patterns, i.e. "large", "small", and "list", when an associated one of buttons 701 to 703 is pressed.

Further, for user authentication, a the "my" button 706 and the common button 707 are displayed. When the "my" button 706 is pressed, only private processing flow buttons generated by a currently logged-in user are displayed. When a common button 707 is pressed, public processing flow buttons generated by all users and processing flow buttons generated in a user authentication OFF state are displayed.

Figure 8:
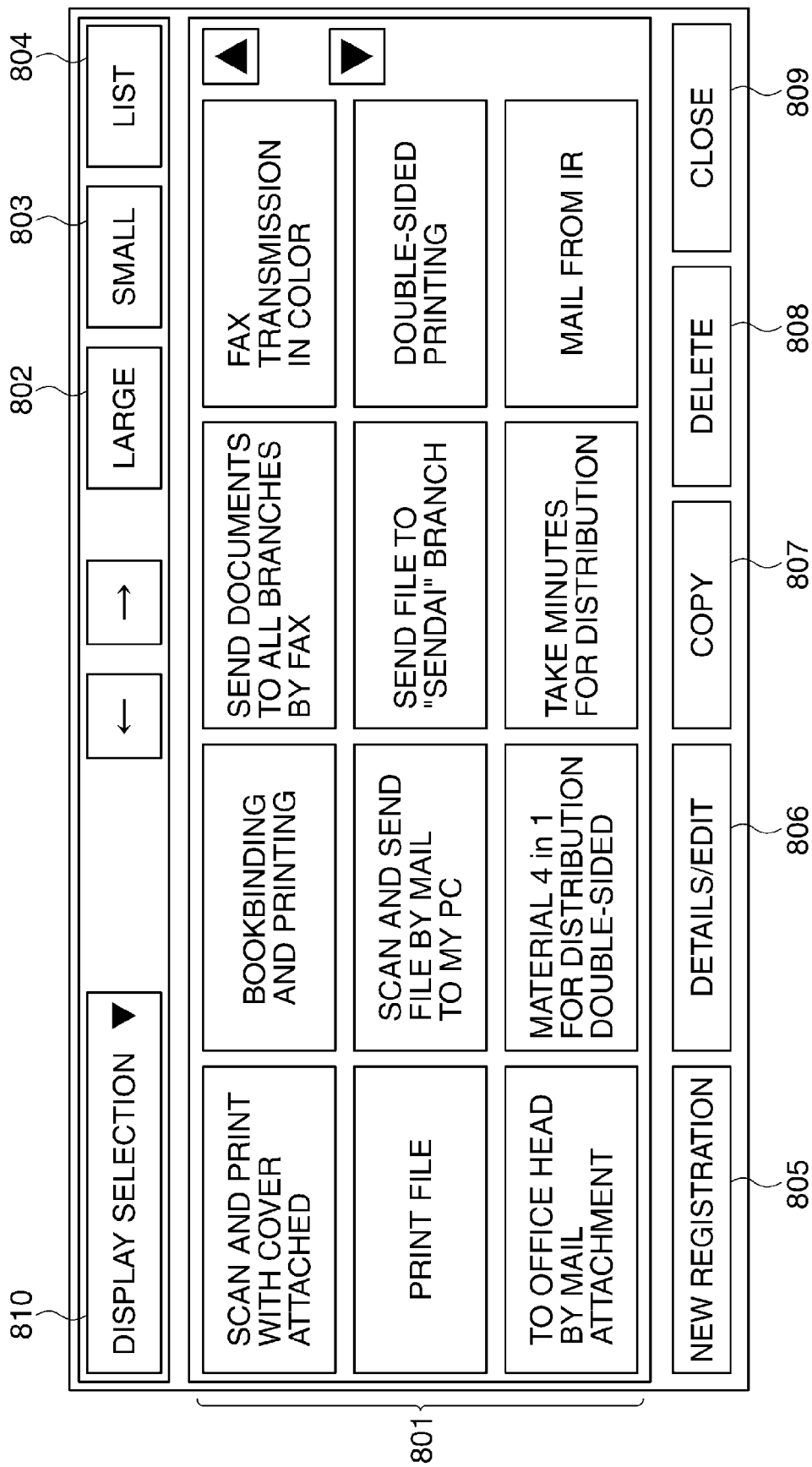
FIG. 8 is a view of a registration/edit selecting screen displayed on the LCD display section when a register/edit button appearing in FIG. 7 is pressed.

Further, when a register/edit button 705 is pressed, a registration/edit selecting screen, described hereinafter with reference to FIG. 8, is displayed on the LCD display section 221.

FIG. 8 is a view of the registration/edit selecting screen displayed on the LCD display section 221 when the register/edit button 705 appearing in FIG. 7 is pressed.

Referring to FIG. 8, a processing flow button group 801 is comprised of buttons that provide images indicative of respective processing flow information items stored in the XML file 604. The display mode of the processing flow button group 801 is switched between three patterns, i.e. "large", "small", and "list", when an associated one of buttons 802 to 804 is pressed.

Figure 9:
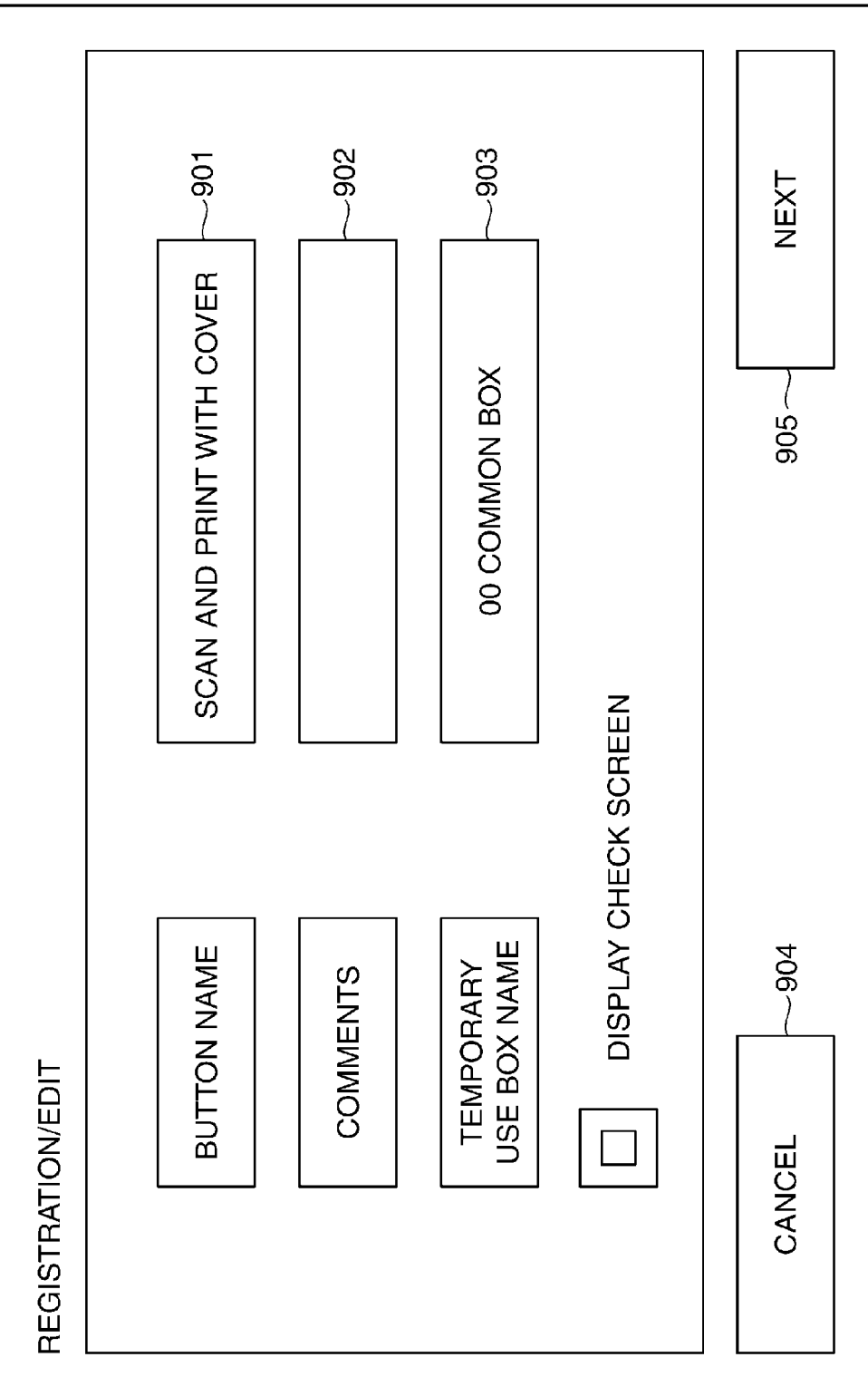
FIG. 9 is a view of a registration/edit screen displayed on the LCD display section when a new registration button or a details/edit button appearing in FIG. 8 is pressed.

Further, when a new registration button 805 is pressed, processing flow information is generated in the temporary storage area 603, and a registration/edit screen, described hereinafter with reference to FIG. 9, is displayed on the LCD display section 221.

When a details/edit button 806 is pressed with one button of the processing flow button group 801 selected, an associated processing flow information item is read from the XML file 604 and is stored in the temporary storage area 603, and the registration/edit screen shown in FIG. 9 is displayed on the LCD display section 221.

When a copy button 807 is pressed with one button of the processing flow button group 801 selected, an associated processing flow information item is read from the XML file 604 and is stored in the temporary storage area 603, and the processing flow information item read and stored in the temporary storage area 603 is added as a new processing flow to the XML file 604. Thus, the copying of the processing flow is performed.

When a delete button 808 is pressed with one button of the processing flow button group 801 selected, a processing flow information item associated with the currently selected processing flow is deleted from the XML file 604.

When a close button 809 is pressed, the registration/edit selecting screen is switched back to the initial operation screen shown in FIG. 7.

When a display select button 810 is pressed, a pull-down list (not shown) from which my button display or common button display can be selected is displayed. In this case, when the my button display is selected, only private processing flow buttons generated by the currently logged-in user are displayed, whereas when the common button display is selected, public processing flow buttons generated by all the users and processing flow buttons generated in the user authentication OFF state are displayed.

FIG. 9 is a view of the registration/edit screen displayed on the LCD display section 221 when the new registration button 805 or the details/edit button 806 appearing in FIG. 8 is pressed.

As shown in FIG. 9, a button name is displayed in an area 901, comments are displayed in an area 902, and the name of a temporary use box is displayed in an area 903.

When a cancel button 904 is pressed, the processing flow information generated and stored in the temporary storage area 603 is discarded, and the screen is switched back to the registration/edit selecting screen shown in FIG. 8.

Figure 10:
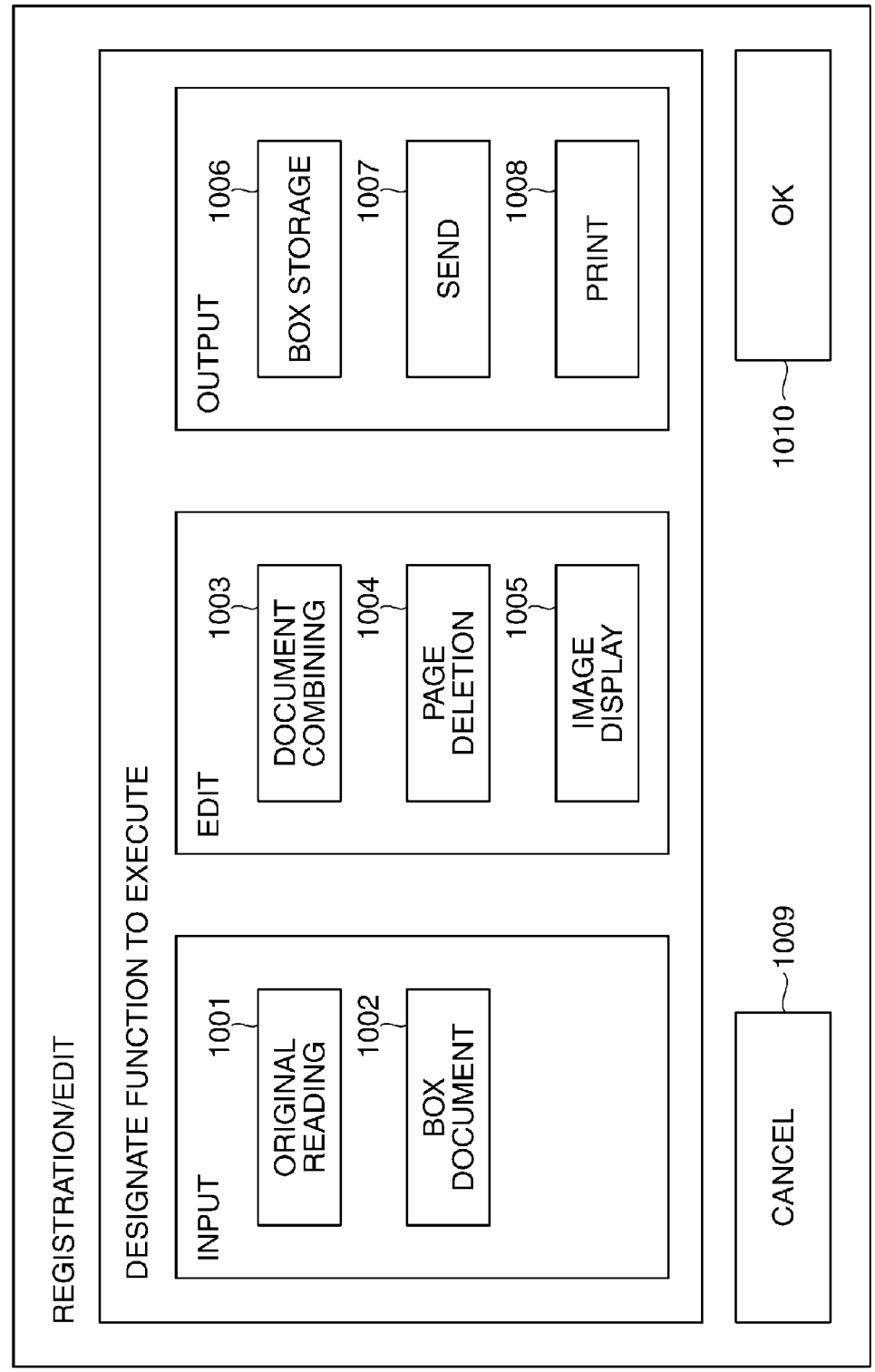
FIG. 10 is a view of a processing information registration/edit screen displayed on the LCD display section when a next button appearing in FIG. 9 is pressed.

When information is entered in each of areas 901 to 903 and a next button 905 is pressed, a processing information registration/edit screen, described hereinafter with reference to FIG. 10, is displayed on the LCD display section 221.

FIG. 10 is a view of the processing information registration/edit screen displayed on the LCD display section 221 when the next button 905 appearing in FIG. 9 is pressed.

Referring to FIG. 10, an original read button 1001, a box document button 1002, a document combining button 1003, a page deletion button 1004, an image display button 1005, a box storage button 1006, a send button 1007, and a print button 1008 are each used to display a screen for configuring settings for an associated process on the LCD display section 221. For example, when the box document button 1002 is pressed, a box document process configuration screen, described hereinafter with reference to FIG. 11, is displayed on the LCD display section 221.

Further, when a cancel button 1009 is pressed, processing flow information generated and stored in the temporary storage area 603 is discarded, and the screen is switched back to the registration/edit selecting screen shown in FIG. 8.

On the other hand, when an OK button 1010 is pressed, processing flow information generated and stored in the temporary storage area 603 is stored in the XML file 604. Then, the screen is switched back to the registration/edit selecting screen shown in FIG. 8. FIGS. 14A-14C collectively show an example of processing flow information stored in the XML file 604.

FIG. 11 is a view of the box document process configuration screen displayed on the LCD display section 221 when the box document button 1002 appearing in FIG. 10 is pressed.

Referring to FIG. 11, when a cancel button 1101 is pressed, settings for the box document process in the processing flow information generated and stored in the temporary storage area 603 are cleared, and then the screen is switched back to the processing information registration/edit screen in FIG. 10.

On the other hand, when an OK button 1102 is pressed, settings for the box document process in the processing flow information generated and stored in the temporary storage area 603 are updated to settings configured on the box document process configuration screen, and then the screen is switched back to the processing information registration/edit screen in FIG. 10.

Next, a description will be given of the processing flow execution process executed by the copying machine as the image processing apparatus according to the present embodiment.

FIGS. 12A to 12F are a flowchart of the processing flow execution process executed by the copying machine. This process is executed by the CPU 201 of the copying machine 101.

Figures 1, 12A:
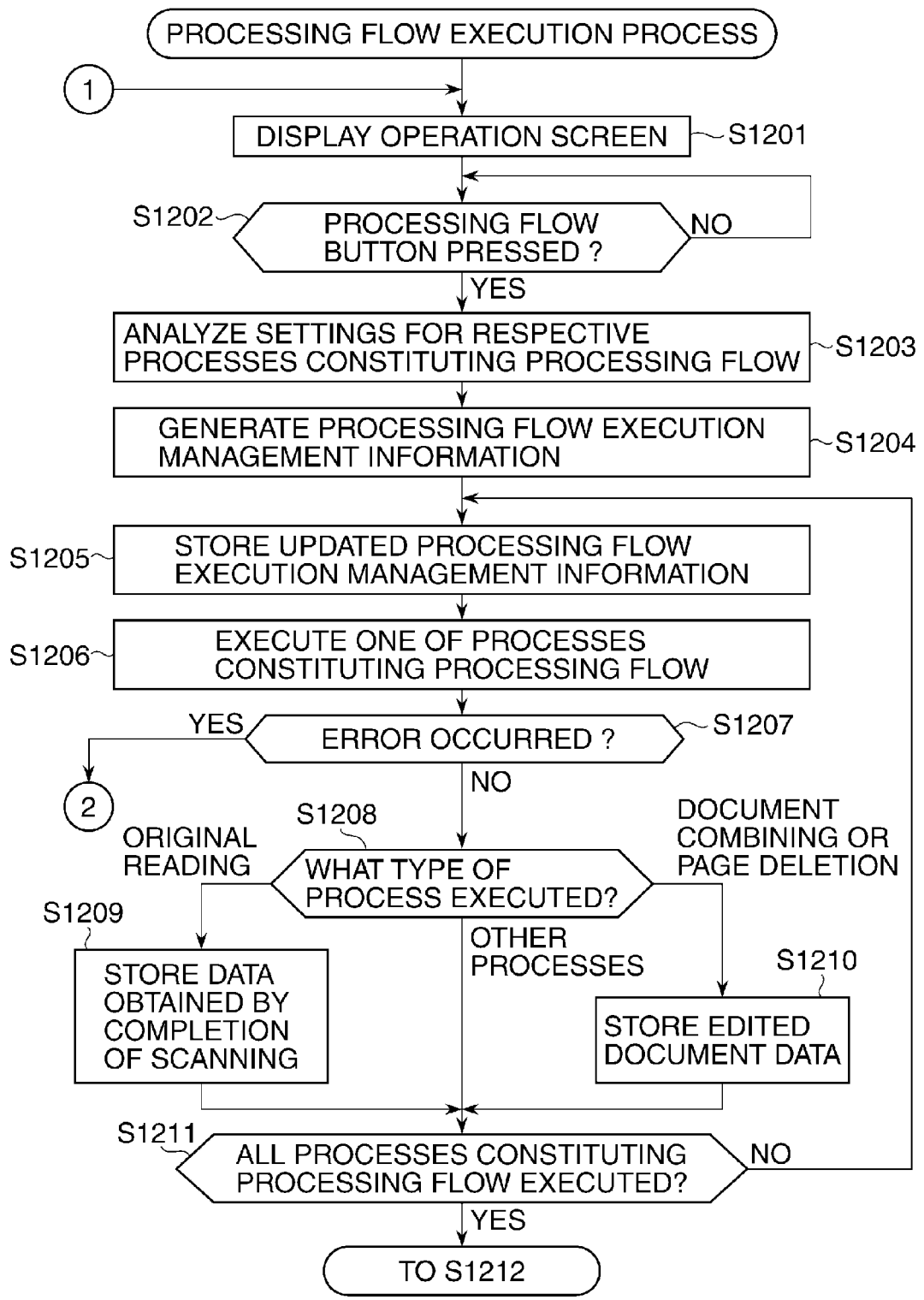
FIG. 12A is a flowchart of a processing flow execution process executed by the copying machine.
Figures 2, 12A:
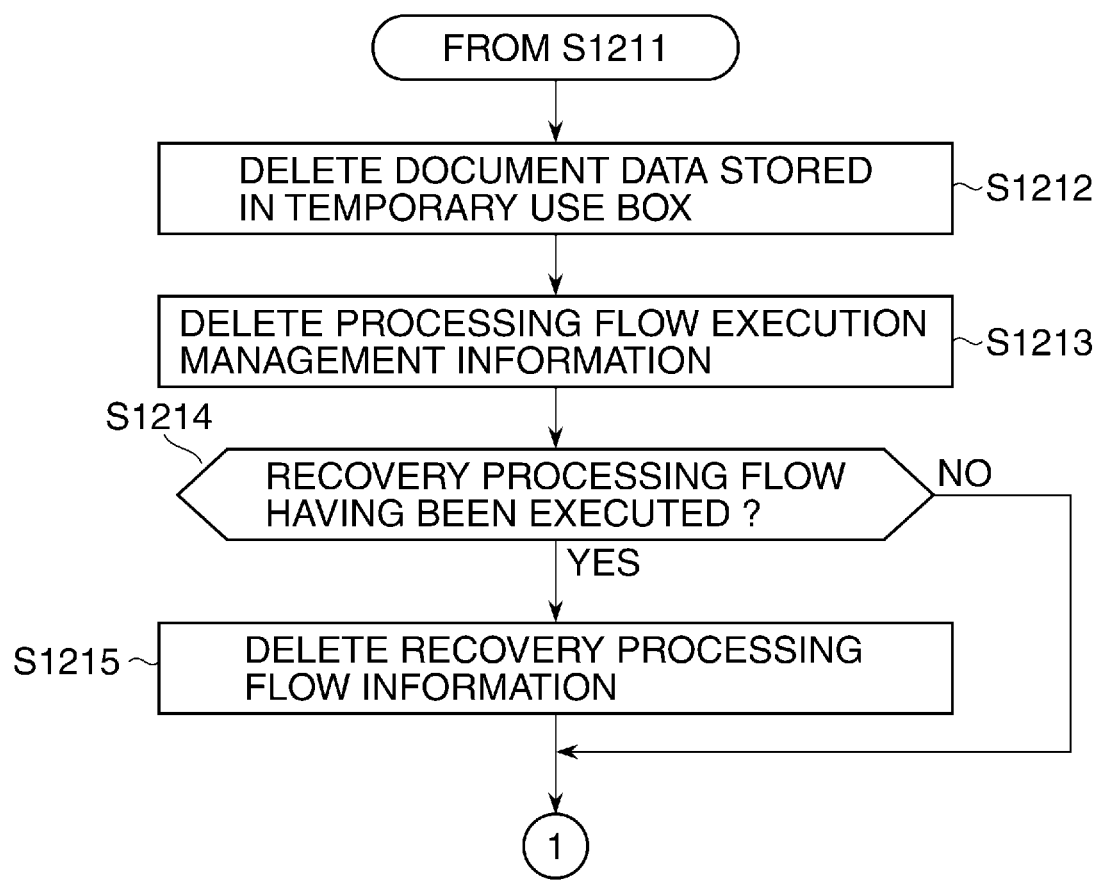

As shown in FIG. 12A, first, the CPU 201 of the copying machine 101 causes the LCD display section 221 to display the operation screen shown in FIG. 7 (step S1201). On this operation screen is displayed the processing flow button group 704 associated with processing flow information stored in the XML file 604.

Then, it is determined whether or not any button of the processing flow button group 704 have been pressed (step S1202).

If it is determined in the step S1202 that any button of the processing flow button group 704 have been pressed (YES to the step S1202), a processing flow information item associated with the pressed button is read from the XML file 604. Then, the read processing flow information item is stored in the temporary storage area 603, and settings for respective processes constituting the processing flow are analyzed (step S1203).

Then, processing flow execution management information associated with the pressed button of the processing flow button group 704 is generated (step S1204). In the processing flow execution management information are recorded the management ID of the processing flow, information on currently executed processing and the like, based on which the status of execution of the processing flow can be checked. The processing flow execution management information is stored in the XML file 604. FIG. 15 shows an example of the processing flow execution management information stored in the XML file 604.

Then, the processing flow execution management information is read from the XML file 604, and the read information is stored in the temporary storage area 603. Thereafter, the information of the currently executed processing is updated to that of processing to be executed next, and the processing flow execution management information including the updated information is stored in the XML file 604 (step S1205).

Then, one of the processes constituting the processing flow is executed (step S1206).

Then, it is determined whether or not an error has occurred in the process executed in the step S1206 (step S1207).

If it is determined in the step S1207 that no error has occurred (NO to the step S1207), the type of the process executed in the step S1206 is determined (step S1208).

If it is determined in the step S1208 that the type of the process is original reading, document data obtained by completion of scanning is stored in the temporary use box 605 (step S1209), and then the main process proceeds to a step S1211.

If it is determined in the step S1208 that the type of the process is document combining or page deletion, edited document data is stored in the temporary use box 605 (step S1210), and then the main process proceeds to the step S1211.

If it is determined in the step S1208 that the type of the process is not any of original reading, document combining, and page deletion, the main process immediately proceeds to the step S1211.

In the step S1211, it is determined whether or not all the processes constituting the processing flow have been executed. If not all the processes have been executed (NO to the step S1211), the main process returns to the step S1205.

If it is determined in the step S1211 that all the processes have been executed (YES to the step S1211), the document data stored in the temporary use box 605 is all deleted (step S1212).

Then, the execution management information on the processing flow having been executed is deleted from the XML file 604 (step S1213).

Then, it is determined whether or not the processing flow having been executed is a recovery processing flow (step S1214).

If it is determined in the step S1214 that the processing flow is a recovery processing flow (YES to the step S1214), recovery processing flow information on the recovery processing flow having been executed is deleted from the XML file 604 (step S1215).

If it is determined in the step S1214 that the processing flow is not a recovery processing flow (NO to the step S1214), or after execution of the step S1215, the main process returns to the step S1201.

Figures 1, 12B:
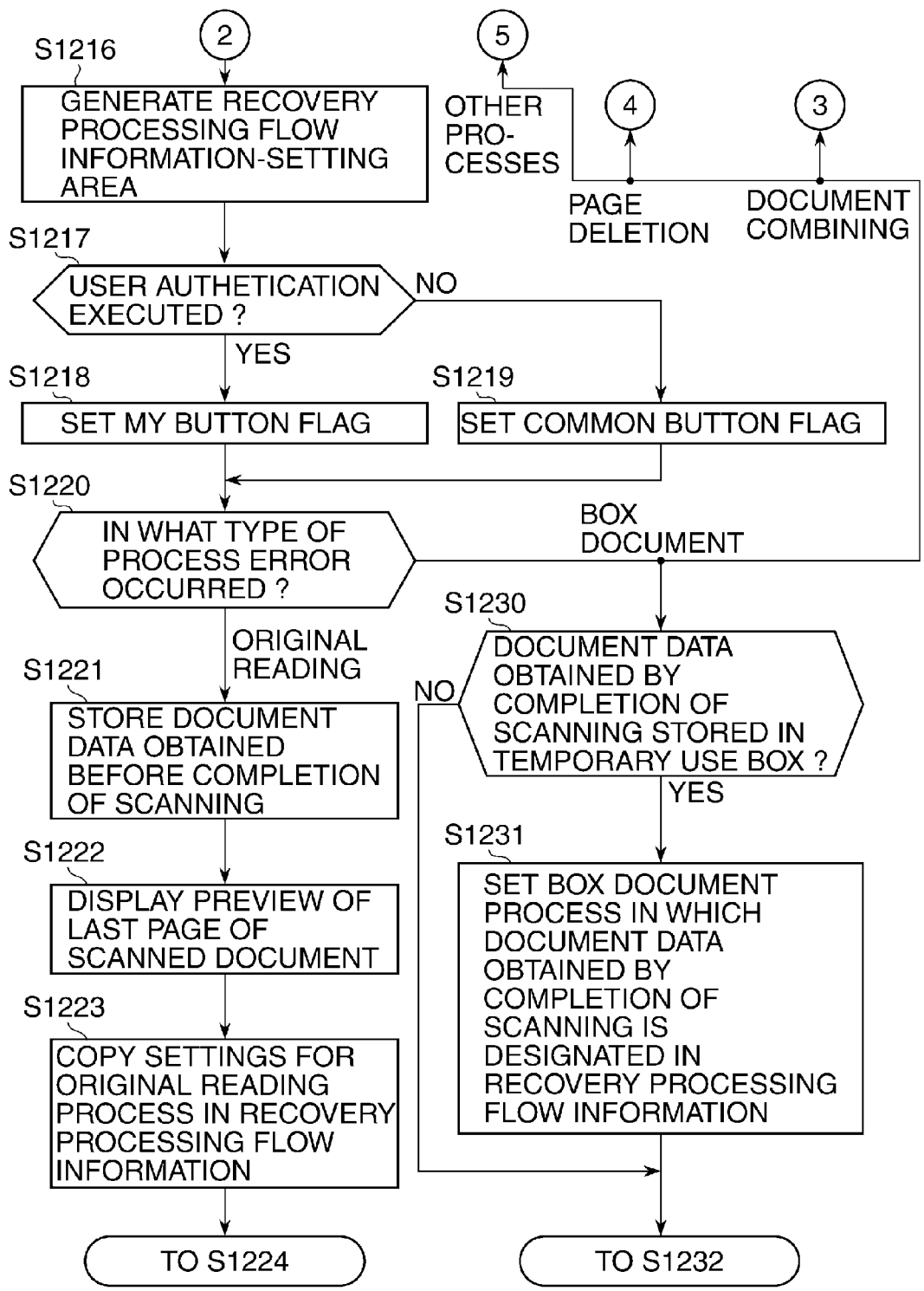
FIG. 12B is a continuation of FIG. 12A, in which steps S1216 et seq. are shown.
Figures 2, 12B:
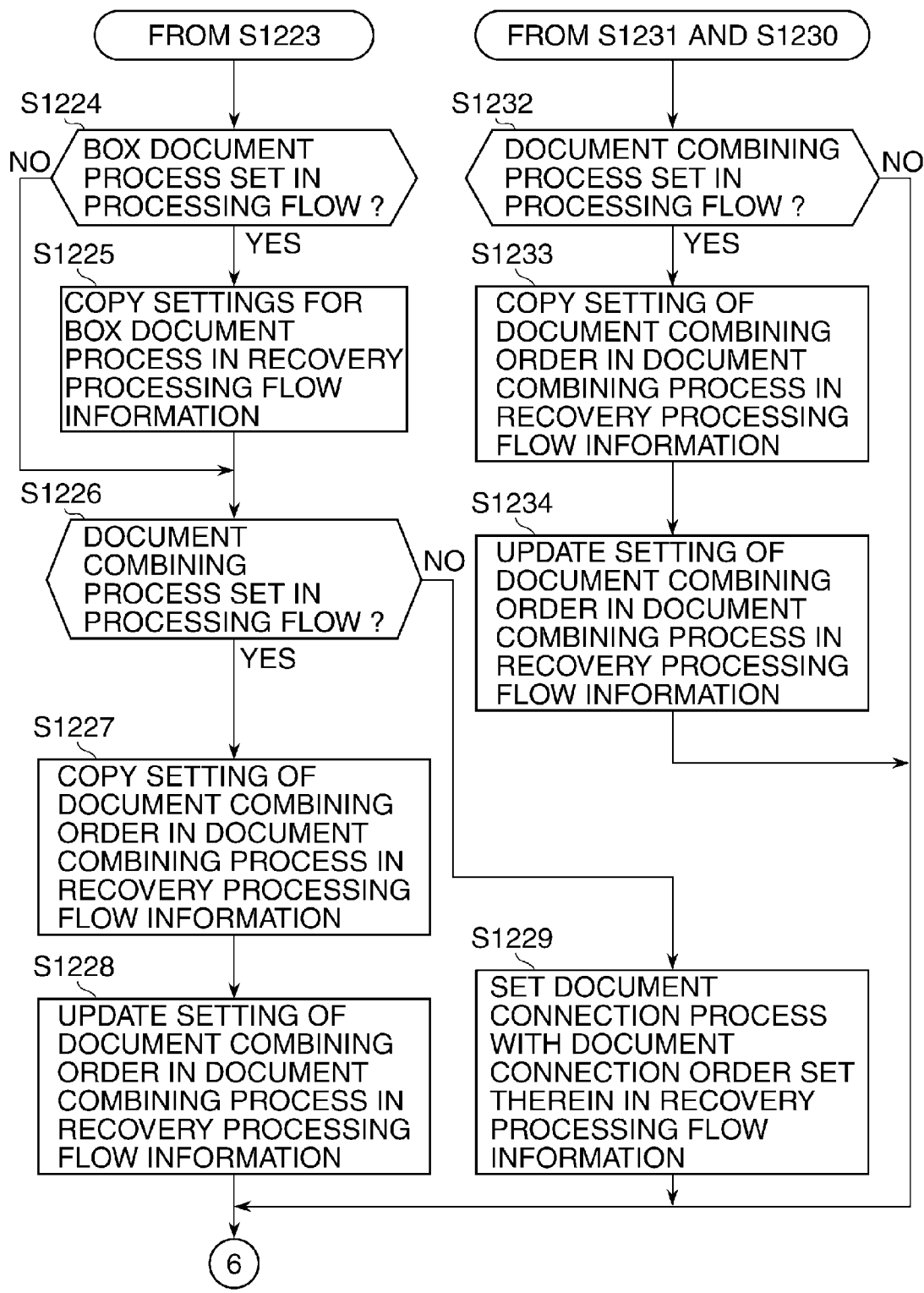

If it is determined in the step S1207 that an error has occurred (YES to the step S1207), the main process immediately proceeds to a step S1216 in FIG. 12B.

Referring to FIG. 12B, in the step S1216, a recovery processing flow information-setting area is generated in the temporary storage area 603.

Then, it is determined whether or not user authentication has been completed (step S1217).

If it is determined in the step S1217 that user authentication has been completed (YES to the step S1217), a flag of the my button is set in the recovery processing flow information (step S1218), and then the main process proceeds to a step S1220.

If it is determined in the step S1217 that user authentication has not been completed (NO to the step S1217), a flag of the common button is set in the recovery processing flow information (step S1219), and then the main process proceeds to the step S1220.

In the step S1220, the category of the process in which the error occurred is determined.

If it is determined in the step S1220 that the category of the process is original reading, document data obtained before completion of scanning is stored in the temporary use box 605 set in the processing flow information (step S1221).

Then, the last page of the scanned document is previewed (step S1222) so as to notify the user where the original reading process has been interrupted.

Then, settings configured for the original reading process in the processing flow having been executed are copied in the recovery processing flow information (step S1223).

Then, it is determined whether or not a box document process is set in the processing flow having been executed (step S1224).

If it is determined in the step S1224 that the box document process is set (YES to the step S1224), settings configured for the box document process in the processing flow having been executed are copied in the recovery processing flow information (step S1225), and then the main process proceeds to a step S1226.

If it is determined in the step S1224 that the box document process is not set (NO to the step S1224), the main process immediately proceeds to the step S1226.

In the step S1226, it is determined whether or not a document combining process is set in the processing flow having been executed.

If it is determined in the step S1226 that the document combining process is set in the processing flow (YES to the step S1226), a setting of a document combining order in the document combining process in the processing flow having been executed is copied in the recovery processing flow information (step S1227).

Figure 12C:
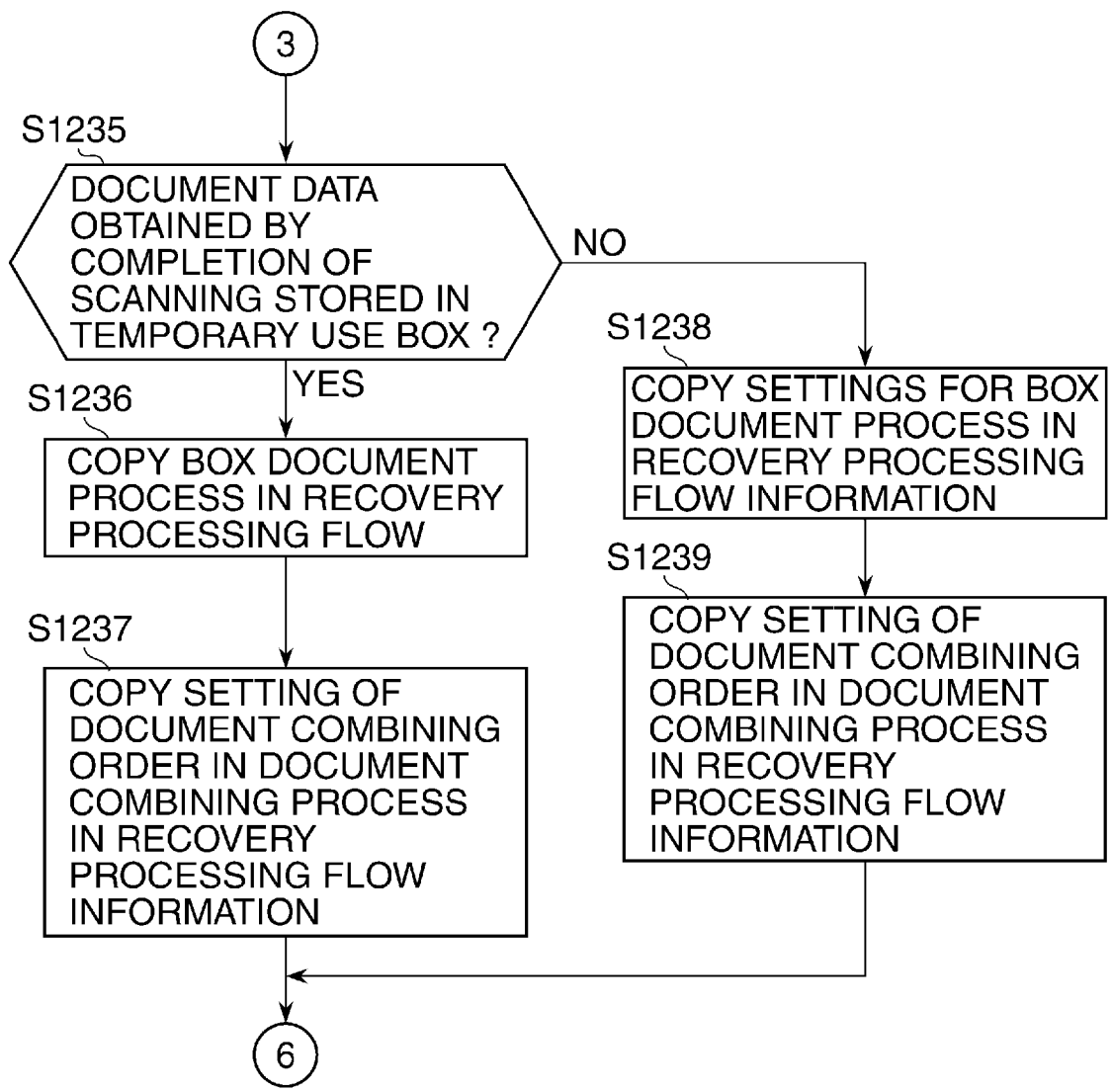
FIG. 12C is a continuation of FIG. 12B, in which steps S1235 et seq. are shown.
Figure 12D:
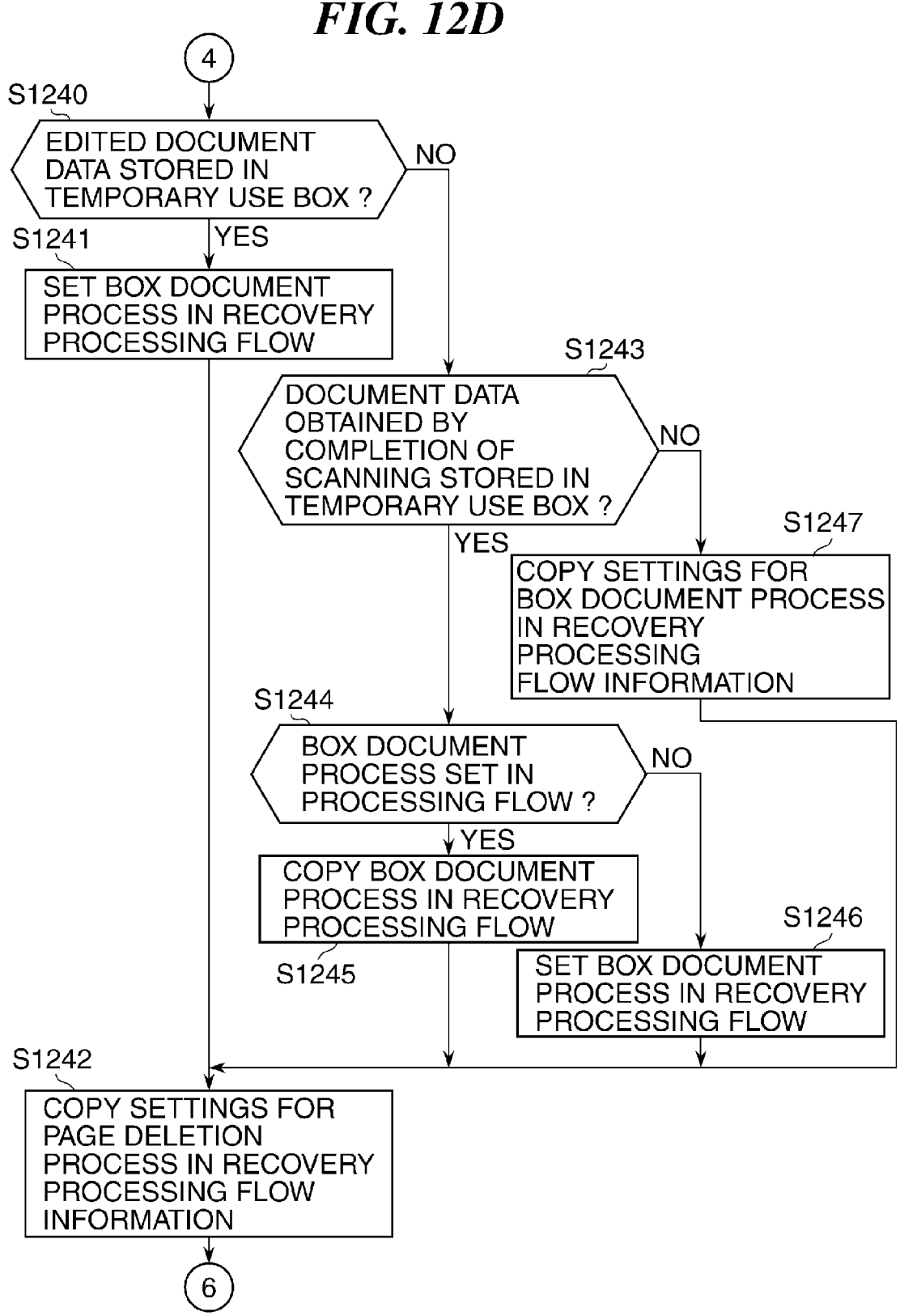
FIG. 12D is a continuation of FIG. 12B, in which steps S1240 et seq. are shown.
Figure 12E:
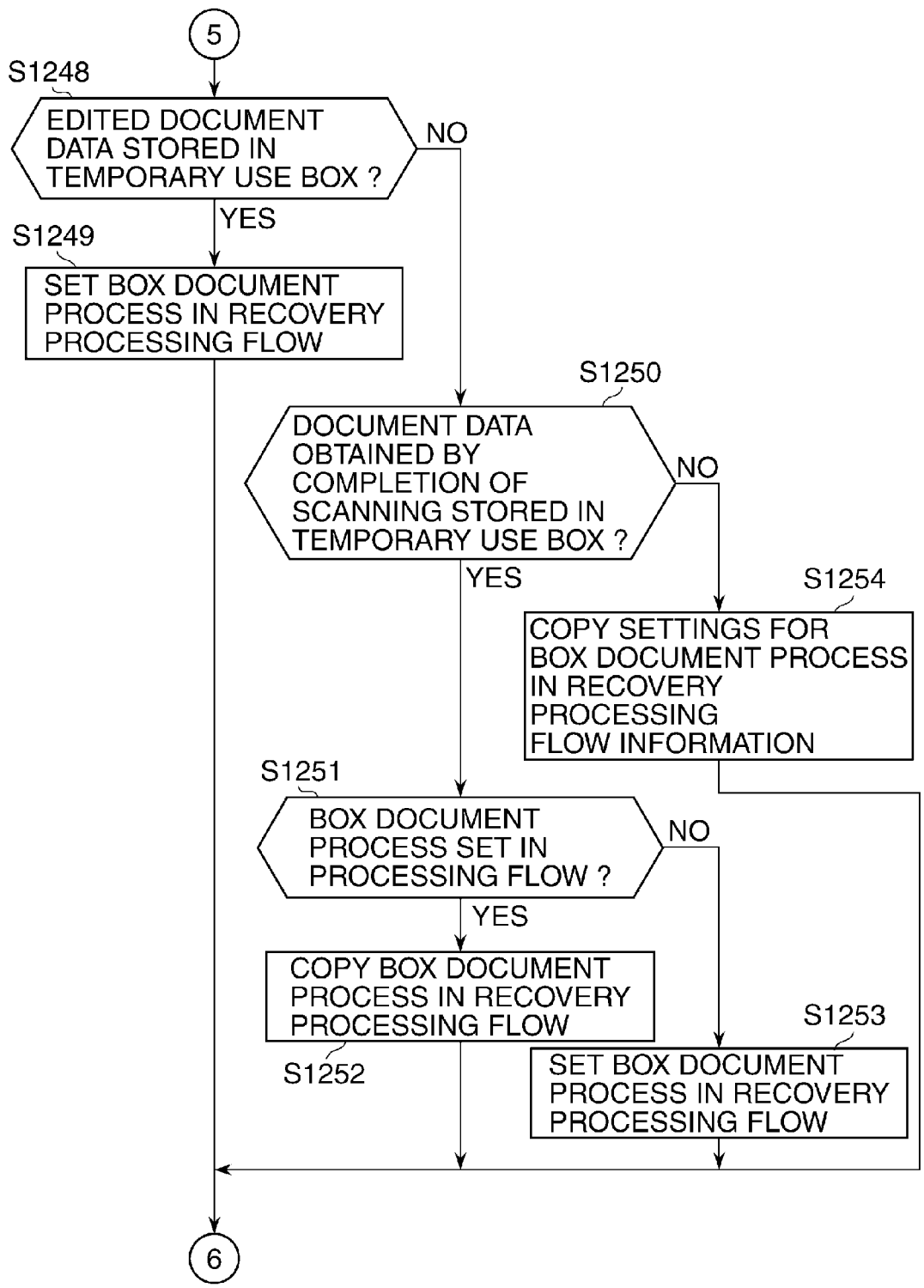
FIG. 12E is a continuation of FIG. 12B, in which steps S1248 et seq. are shown.
Figures 1, 12F:
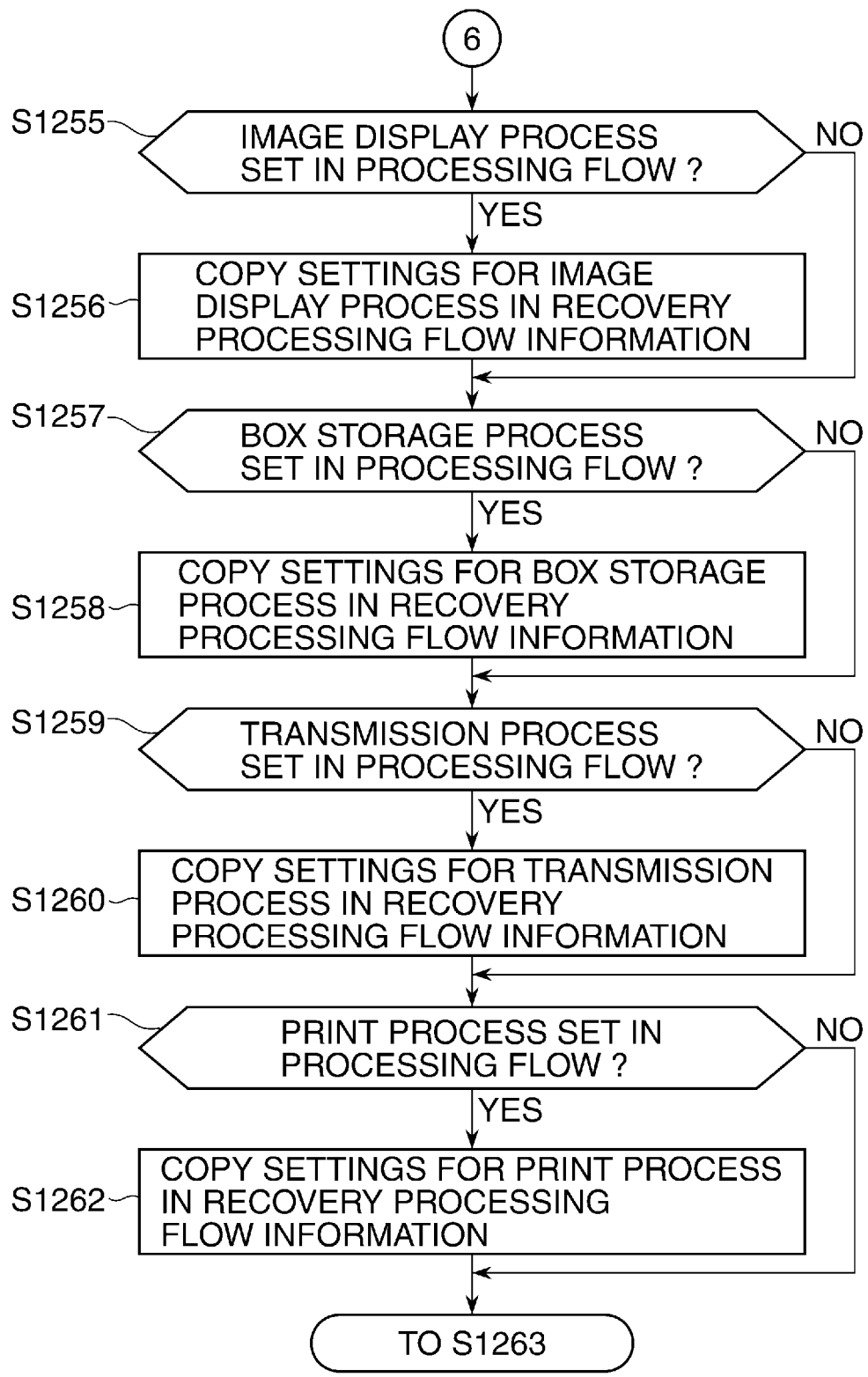
FIG. 12F is a continuation of FIG. 12B, in which steps S1255 et seq. are shown.
Figures 2, 12F:
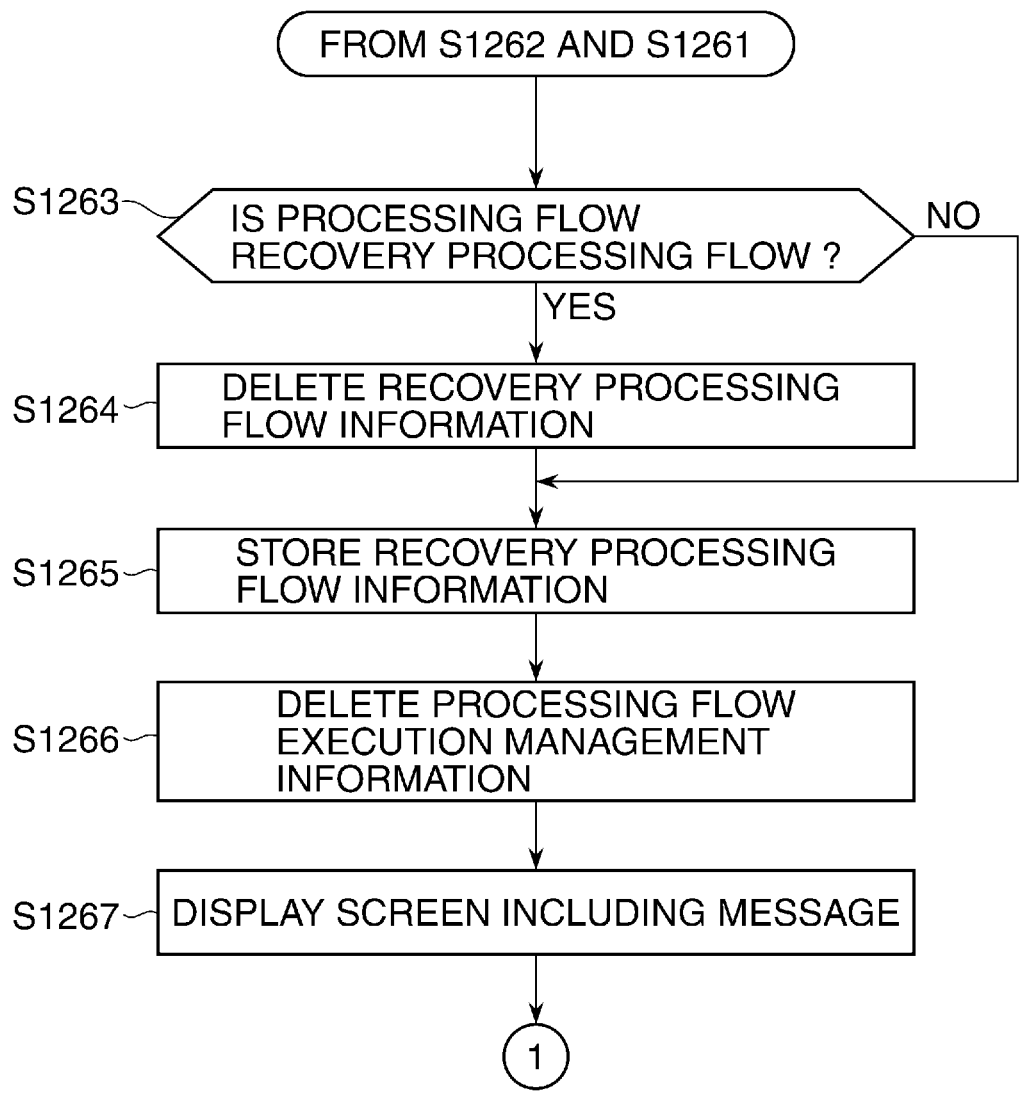

Then, the setting of a document combining order in the document combining process in the recovery processing flow information is updated such that the document data stored in the temporary use box 605 in the step S1221 comes before the start of document data obtained by scanning (step S1228), and then the main process proceeds to a step S1255 in FIG. 12F.

If it is determined in the step S1226 that the document combining process is not set in the processing flow (NO to the step S1226), a document combining process configured such that the document data stored in the temporary use box 605 in the step S1221 is to be joined to the start of the document data from the scanned document is set in the recovery processing flow information (step S1229), and then the main process proceeds to the step S1255 in FIG. 12F.

If it is determined in the step S1220 that the type of the process is box document, it is determined whether or not document data obtained by completion of scanning is stored in the temporary use box 605 (step S1230).

If it is determined in the step S1230 that document data obtained by completion of scanning is stored (YES to the step S1230), a box document process configured such that the document data is designated is set in the recovery processing flow (step S1231), and then the main process proceeds to a step S1232.

If it is determined in the step S1230 that document data obtained by completion of scanning is not stored (NO to the step S1230), the main process immediately proceeds to the step S1232.

In the step S1232, it is determined whether or not a document combining process is set in the processing flow having been executed.

If it is determined in the step S1232 that a document combining process is set in the processing flow (YES to the step S1232), a setting of a document combining order in the document combining process in the processing flow having been executed is copied in the recovery processing flow information (step S1233).

Then, the setting of a document combining order in the document combining process in the recovery processing flow information is updated such that the designation of a scanned document in a portion of the recovery processing flow information is replaced by designation of the document data obtained by completion of scanning (step S1234), and then the main process proceeds to the step S1255 in FIG. 12F.

If it is determined in the step S1232 that a document combining process is not set in the processing flow (NO to the step S1232), the main process immediately proceeds to the step S1255 in FIG. 12F.

If it is determined in the step S1220 that the type of the process is document combining, the main process proceeds to a step S1235 in FIG. 12C.

Referring to FIG. 12C, in the step S1235, it is determined whether or not document data obtained by completion of scanning is stored in the temporary use box 605.

If it is determined in the step S1235 that document data obtained by completion of scanning is stored (YES to the step S1235), the box document process in the processing flow having been executed is copied in the recovery processing flow, and settings for the box document process are updated such that designation of the document data obtained by completion of scanning is added (step S1236).

Then, the setting of the document combining order in the document combining process in the processing flow having been executed is copied in the recovery processing flow information, and the setting of a document combining order in the document combining process in the recovery processing flow information is updated such that the designation of a scanned document in a portion of the recovery processing flow information is replaced by designation of the document data obtained by completion of scanning (step S1237), and then the main process proceeds to the step S1255 in FIG. 12F.

If it is determined in the step S1235 that document data obtained by completion of scanning is not stored (NO to the step S1235), the settings configured for the box document process in the processing flow having been executed are copied in the recovery processing flow information (step S1238).

Then, the setting of the document combining order in the document combining process in the processing flow having been executed is copied in the recovery processing flow information (step S1239), and then the main process proceeds to the step S1255 in FIG. 12F.

Referring again to FIG. 12B, if it is determined in the step S1220 that the type of the process is page deletion, the main process proceeds to a step S1240 in FIG. 12D.

Referring to FIG. 12D, in the step S1240, it is determined whether or not edited document data is stored in the temporary use box 605.

If it is determined in the step S1240 that edited document data is stored (YES to the step S1240), a box document process in which the edited document data is designated is set in the recovery processing flow (step S1241), and then the main process proceeds to a step S1242.

If it is determined in the step S1240 that edited document data is not stored (NO to the step S1240), it is determined whether or not document data obtained by completion of scanning is stored in the temporary use box 605 (step S1243).

If it is determined in the step S1243 that document data obtained by completion of scanning is stored (YES to the step S1243), it is determined whether or not a box document process is set in the processing flow having been executed (step S1244).

If it is determined in the step S1244 that a box document process is set in the processing flow having been executed (YES to the step S1244), the box document process in the processing flow having been executed is copied in the recovery processing flow, and settings thereof are configured such that designation of the document data obtained by completion of scanning is added (step S1245), and then the main process proceeds to the step S1242.

If it is determined in the step S1244 that a box document process is not set in the processing flow having been executed (NO to the step S1244), a box document process in which the document data obtained by completion of scanning is designated is set in the recovery processing flow (step S1246), and then the main process proceeds to the step S1242.

If it is determined in the step S1243 that document data obtained by completion of scanning is not stored (NO to the step S1243), settings for the box document process in the processing flow having been executed are copied in the recovery processing flow information (step S1247), and then the main process proceeds to the step S1242.

In the step S1242, settings for the page deletion process in the processing flow having been executed are copied in the recovery processing flow information, and then the main process proceeds to the step S1255 in FIG. 12F.

Referring again to FIG. 12B, if it is determined in the step S1220 that the type of the process is not any of original reading, box document, document combining, and page deletion, the main process immediately proceeds to a step S1248 in FIG. 12E.

Referring to FIG. 12E, in the step S1248, it is determined whether or not edited document data is stored in the temporary use box 605.

If it is determined in the step S1248 that edited document data is stored (YES to the step S1248), a box document process in which the edited document data is designated is set in the recovery processing flow (step S1249), and then the main process proceeds to the step S1255 in FIG. 12F.

If it is determined in the step S1248 that edited document data is not stored (NO to the step S1248), it is determined whether or not document data obtained by completion of scanning is stored in the temporary use box 605 (step S1250).

If it is determined in the step S1250 that document data obtained by completion of scanning is stored (YES to the step S1250), it is determined whether or not a box document process is set in the processing flow having been executed (step S1251).

If it is determined in the step S1251 that a box document process is set in the processing flow having been executed (YES to the step S1251), the box document process in the processing flow having been executed is copied in the recovery processing flow, and settings thereof are configured such that designation of the document data obtained by completion of scanning is added (step S1252). Then the main process proceeds to the step S1255 in FIG. 12F.

If it is determined in the step S1251 that a box document process is not set in the processing flow having been executed (NO to the step S1251), a box document process in which the document data obtained by completion of scanning is designated is set in the recovery processing flow (step S1253), and then the main process proceeds to the step S1255 in FIG. 12F.

If it is determined in the step S1250 that document data obtained by completion of scanning is not stored (NO to the step S1250), settings for the box document process in the processing flow having been executed are copied in the recovery processing flow information (step S1254), and then the main process proceeds to the step S1255 in FIG. 12F.

Referring to FIG. 12F, in the step S1255, it is determined whether or not an image display process is set in the processing flow having been executed.

If it is determined in the step S1255 that an image display process is set in the processing flow having been executed (YES to the step S1255), settings for the image display process in the processing flow having been executed are copied in the recovery processing flow information (step S1256), and then the main process proceeds to a step S1257.

If it is determined in the step S1255 that an image display process is not set in the processing flow having been executed (NO to the step S1255), the main process immediately proceeds to the step S1257.

In the step S1257, it is determined whether or not a box storage process is set in the processing flow having been executed.

If it is determined in the step S1257 that a box storage process is set in the processing flow having been executed (YES to the step S1257), settings for the box storage process in the processing flow having been executed are copied in the recovery processing flow information (step S1258), and then the main process proceeds to a step S1259.

If it is determined in the step S1257 that the box storage process is not set in the processing flow having been executed (NO to the step S1257), the main process immediately proceeds to the step S1259.

In the step S1259, it is determined whether or not a transmission process is set in the processing flow having been executed.

If it is determined in the step S1259 that a transmission process is set in the processing flow having been executed (YES to the step S1259), settings for the transmission process in the processing flow having been executed are copied in the recovery processing flow information (step S1260), and then the main process proceeds to a step S1261.

If it is determined in the step S1259 that a transmission process is not set in the processing flow having been executed (NO to the step S1259), the main process immediately proceeds to the step S1261.

In the step S1261, it is determined whether or not a print process is set in the processing flow having been executed.

If it is determined in the step S1261 that a print process is set in the processing flow having been executed (YES to the step S1261), settings for the print process in the processing flow having been executed are copied in the recovery processing flow information (step S1262), and then the main process proceeds to a step S1263.

If it is determined in the step S1261 that a print process is not set in the processing flow having been executed (NO to the step S1261), the main process immediately proceeds to the step S1263.

In the step S1263, it is determined whether or not the processing flow having been executed is a recovery processing flow.

If it is determined in the step S1263 that the processing flow having been executed is a recovery processing flow (YES to the step S1263), recovery processing flow information on the recovery processing flow having been executed is deleted from the XML file 604 (step S1264), and then the main process proceeds to a step S1265.

If it is determined in the step S1263 that the processing flow having been executed is not a recovery processing flow (NO to the step S1263), the main process immediately proceeds to the step S1265.

In the step S1265, the recovery processing flow information in the temporary storage area 603 is stored in the XML file 604.

Then, the processing flow execution management information is deleted from the XML file 604 (step S1266).

Figure 16:
FIG. 16 is a view of an example of a screen including a message displayed on the LCD display section in a step S1267 in FIG. 12F.
Figure 17:
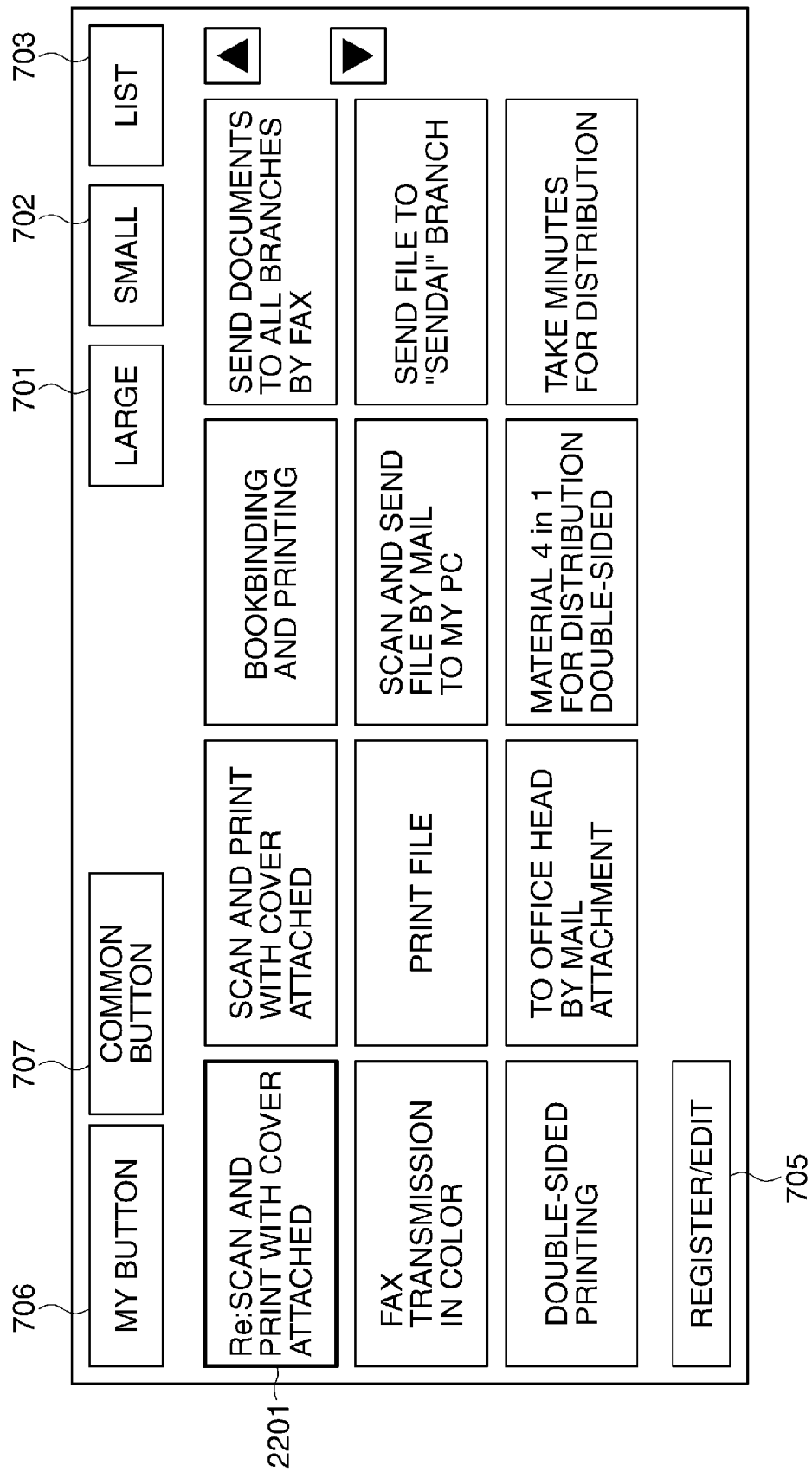
FIG. 17 is a view of an example of an operation screen displayed on the LCD display section in a step S1201 after execution of the step S1267 in FIG. 12F.

Then, a screen including a message shown in FIG. 16 is displayed on the LCD display section 221 (step S1267), followed by the main process returning to the step S1201 in FIG. 12A. At this time, an operation screen having a recovery processing flow button 2201 additionally provided thereon as shown in FIG. 17 is displayed on the LCD display section 221.

According to the processing flow execution process in FIGS. 12A to 12F, it is possible to resume an interrupted processing flow from an interrupted point easily and efficiently by pressing the recovery processing flow button 2201 additionally provided on the operation screen displayed on the LCD display section 221, so that user friendliness can be enhanced.

Next, a description will be given of a processing flow execution process executed when the application described above is restarted after forcible termination e.g. due to occurrence of power failure during execution of the above-described processing flow execution process by the copying machine as the image processing apparatus according to the present embodiment.

Figures 1, 13:
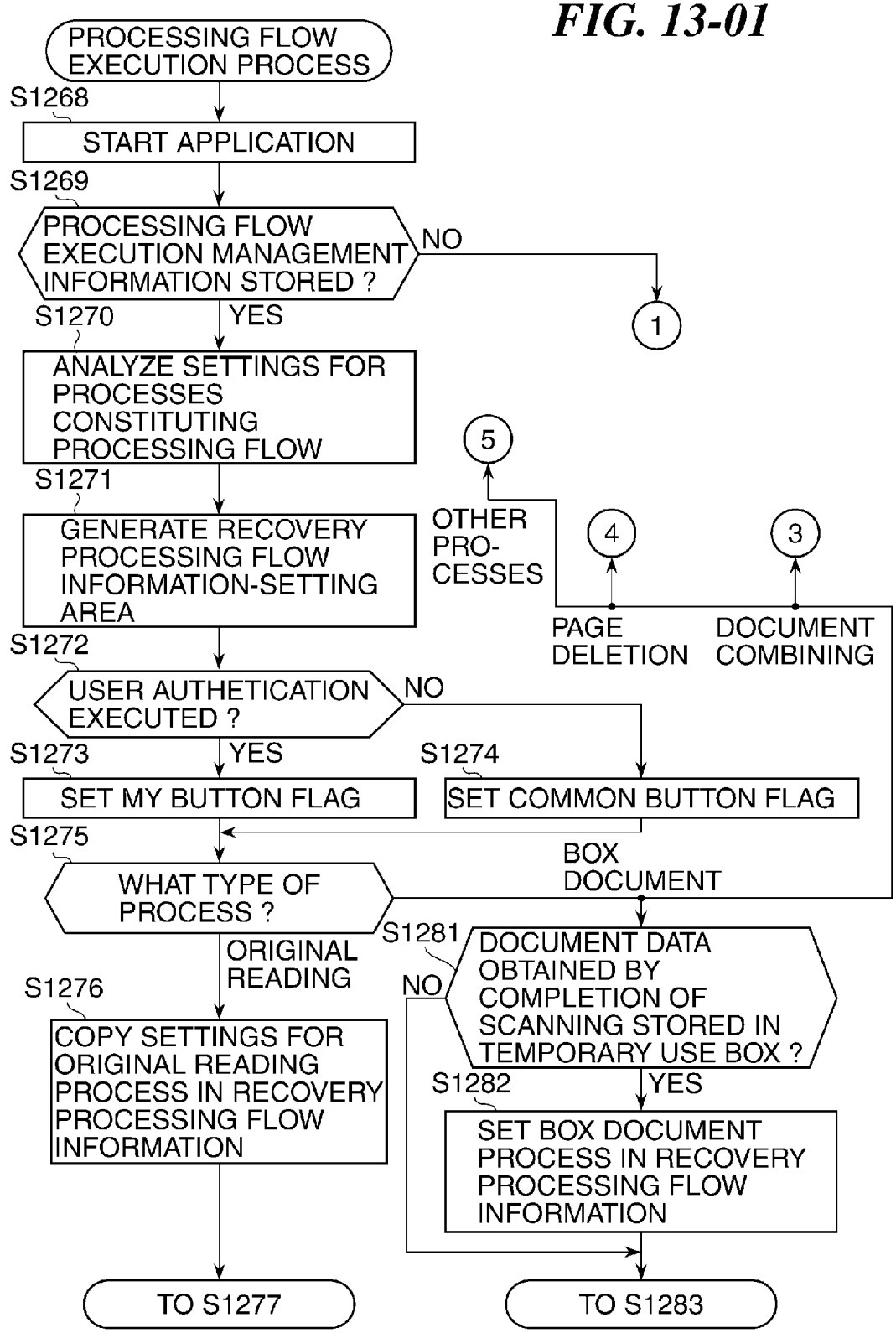
FIG. 13 is a flowchart of a processing flow execution process executed by the copying machine, after restart of the above-mentioned application.
Figures 2, 13:
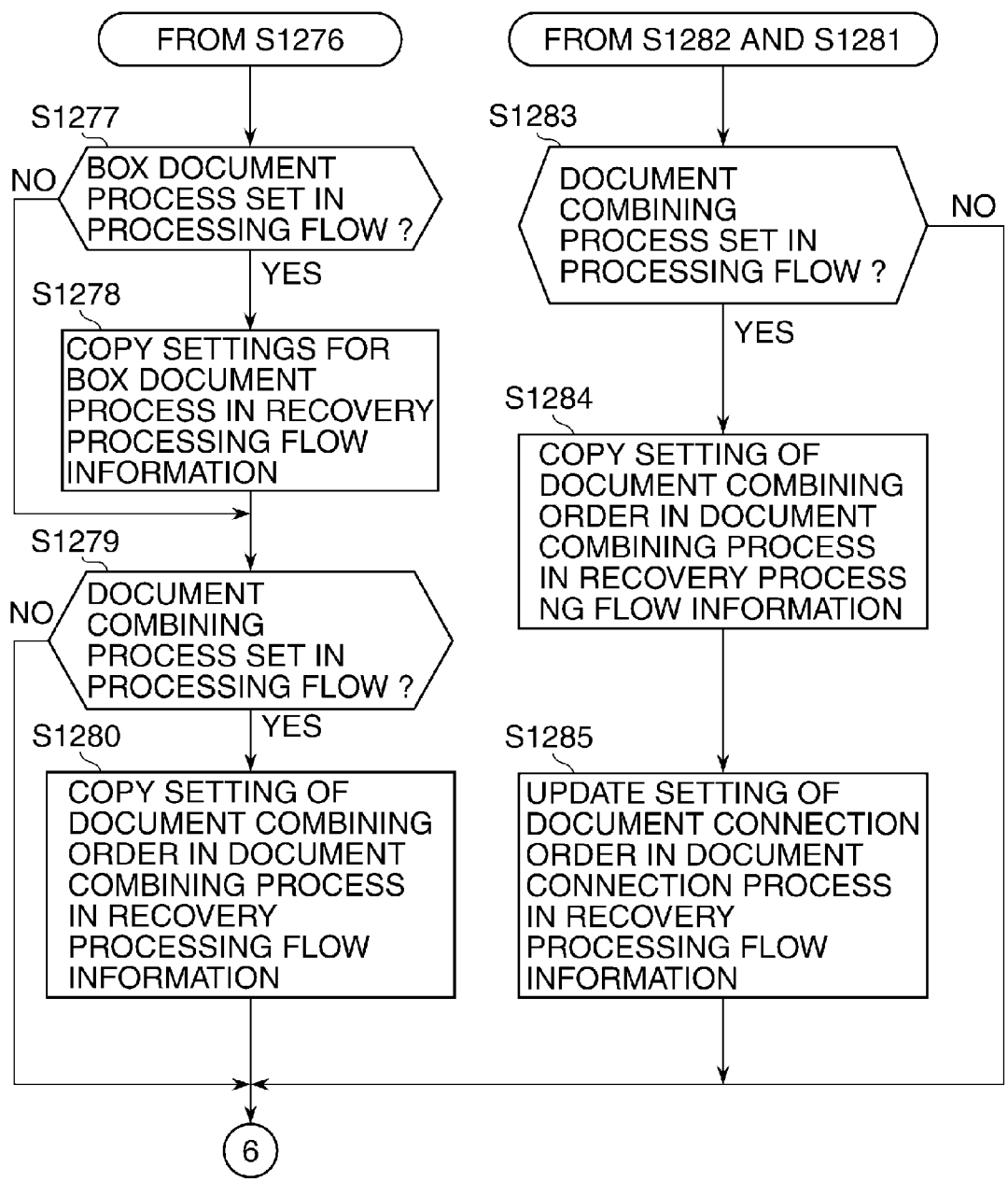

FIG. 13 is a flowchart of the processing flow execution process executed by the copying machine, after the restart of the application. The present process is executed by the CPU 201 of the copying machine 101.

The process shown in the FIG. 13 flowchart is started in response to power-on of the copying machine 101 after power-off of the same. First, the CPU 201 of the copying machine 101 starts the application and executes an initial process and the like (step S1268).

Then, it is determined whether or not processing flow execution management information is stored in the XML file 604 (step S1269).

If it is determined in the step S1269 that processing flow execution management information is not stored in the XML file 604 (NO to the step S1269), the main process proceeds to the step S1201 in FIG. 12A, and the steps S1201 et seq. are executed.

If it is determined in the step S1269 that processing flow execution management information is stored in the XML file 604 (YES to the step S1269), processing flow information on the processing flow having been executed, which is recorded in the processing flow execution management information, is read from the XML file 604 and stored in the temporary storage area 603, and the settings for the processes constituting the processing flow are analyzed (step S1270).

Then, a recovery processing flow information-setting area is generated in the temporary storage area 603 (step S1271).

Then, it is determined whether or not user authentication has been completed (step S1272).

If it is determined in the step S1272 that user authentication has been completed (YES to the step S1272), a flag of the my button is set in the recovery processing flow information (step S1273), and then the main process proceeds to a step S1275.

If it is determined in the step S1272 that user authentication has not been completed (NO to the step S1272), a flag of the common button is set in the recovery processing flow information (step S1274), and then the main process proceeds to the step S1275.

In the step S1275, the type of a process having been executed is determined based on the processing flow execution management information.

If it is determined in the step S1275 that the type of the process is original reading, settings for the original reading process in the processing flow having been executed are copied in the recovery processing flow information (step S1276).

Then, it is determined whether or not a box document process is set in the processing flow having been executed (step S1277).

If it is determined in the step S1277 that a box document process is set in the processing flow having been executed (YES to the step S1277), settings for the box document process in the processing flow having been executed are copied in the recovery processing flow information (step S1278), and then the main process proceeds to a step S1279.

If it is determined in the step S1277 that a box document process is not set in the processing flow having been executed (NO to the step S1277), the main process immediately proceeds to the step S1279.

In the step S1279, it is determined whether or not a document combining process is set in the processing flow having been executed.

If it is determined in the step S1279 that a document combining process is set in the processing flow (YES to the step S1279), a setting of a document combining order in the document combining process in the processing flow having been executed is copied in the recovery processing flow information (step S1280). Then, the main process proceeds to the step S1255 in FIG. 12F, and the steps S1255 et seq. are executed.

If it is determined in the step S1279 that a document combining process is not set in the processing flow having been executed (NO to the step S1279), the main process immediately proceeds to the step S1255 in FIG. 12F, and the steps S1255 et seq. are executed.

If it is determined in the step S1275 that the type of the process is box document, it is determined whether or not document data obtained by completion of scanning is stored in the temporary use box 605 (step S1281).

If it is determined in the step S1281 that document data obtained by completion of scanning is stored (YES to the step S1281), a box document process in which the document data obtained by completion of scanning is designated is set in the recovery processing flow (step S1282), and then the main process proceeds to a step S1283.

If it is determined in the step S1281 that document data obtained by completion of scanning is not stored (NO to the step S1281), the main process immediately proceeds to the step S1283.

In the step S1283, it is determined whether or not a document combining process is set in the processing flow having been executed.

If it is determined in the step S1283 that a document combining process is set in the processing flow (YES to the step S1283), a setting of a document combining order in the document combining process in the processing flow having been executed is copied in the recovery processing flow information (step S1284).

Then, the setting of the document combining order in the document combining process in the recovery processing flow information is updated such that the designation of a scanned document in a portion of the recovery processing flow information is replaced by designation of the document data obtained by completion of scanning (step S1285). Then, the main process proceeds to the step S1255 in FIG. 12F, and the steps S1255 et seq. are executed.

If it is determined in the step S1283 that a document combining process is not set in the processing flow having been executed (NO to the step S1283), the main process immediately proceeds to the step S1255 in FIG. 12F, and the steps S1255 et seq. are executed.

If it is determined in the step S1275 that the type of the process is document combining, the main process proceeds to the step S1235 in FIG. 12C, and the steps S1235 et seq. are executed.

If it is determined in the step S1275 that the type of the process is page deletion, the main process proceeds to the step S1240 in FIG. 12D, and the steps S1240 et seq. are executed.

If it is determined in the step S1275 that the type of the process is not any of original reading, box document, document combining, and page deletion, the main process immediately proceeds to the step S1248 in FIG. 12E, and the steps S1248 et seq. are executed.

According to the processing flow execution process in FIG. 13, even when the application is terminated e.g. due to power failure, it is possible to achieve the same effects as provided by the processing flow execution process described hereinabove with reference to FIGS. 12A to 12F.

It is to be understood that the present invention may also be accomplished by supplying a system or an apparatus with a storage medium in which a program code of software, which realizes the functions of the above described embodiment, is stored, and causing a computer (or CPU or MPU) of the system or apparatus to read out and execute the program code stored in the storage medium.

In this case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to the exemplary embodiment, it is to be understood that the invention is not limited to the disclosed exemplary embodiment. The scope of the following claims is to be accorded the broadest interpretation so as to encompass all modifications, equivalent structures and functions.

This application claims priority from Japanese Patent Application No. 2008-182719 filed Jul. 14, 2008, which is hereby incorporated by reference herein in its entirety.

What is claimed is:

1. An image processing apparatus comprising:
   an execution unit configured to execute a processing flow for sequentially carrying out a plurality of processes, the processing flow being defined by processing flow information including a description representing the plurality of processes;
   a display section configured to display an operation screen providing a first user with a first option to display indications of private processing flows dedicated to the first user and a second option to display indications of public processing flows generated by at least another user; and
   a recovery processing flow creation unit configured to be operable, when execution of the processing flow executed by the execution unit is interrupted, to create recovery processing flow information defining a recovery processing flow for carrying out yet-to-be-executed ones of the processes included in the interrupted processing flow,
   wherein the execution unit is configured to execute the recovery processing flow defined by the recovery processing flow information created by the recovery processing flow creation unit, and
   wherein the recovery processing flow creation unit is configured to create, when user authentication for the first user has been completed, the recovery processing flow information as one of the private processing flows for the first user.

2. An image processing apparatus according to claim 1, wherein when a power failure occurs in the image processing apparatus during execution of the processing flow executed by the execution unit, thereby causing interruption of the execution of the processing flow executed by the execution unit, the recovery processing flow creation unit is configured to create the recovery processing flow information after restart of the image processing apparatus.

3. An image processing apparatus according to claim 1, wherein when execution of the recovery processing flow by the execution unit is interrupted, the recovery processing flow creation unit is configured to create other recovery processing flow information for continuing the recovery processing flow.

4. An image processing apparatus according to claim 1, further comprising a storage unit configured to store data generated by execution of each of the processes included in the processing flow by the execution unit,
   wherein the recovery processing flow creation unit is configured to create a processing flow for continuing the yet-to-be-executed processes, using data left stored in the storage unit after the interruption of the execution of the processing flow.

5. A method of controlling an image processing apparatus, comprising:
   executing, by an execution unit, a processing flow for sequentially carrying out a plurality of processes, the processing flow being defined by processing flow information including a description representing the plurality of processes;
   displaying, by a display section, an operation screen providing a first user with a first option to display indications of private processing flows dedicated to the first user and a second option to display indications of public processing flows generated by at least another user;
   creating, by a recovery processing flow creation unit, recovery processing flow information defining a recovery processing flow for carrying out yet-to-be-executed ones of the processes included in the interrupted processing flow, when execution of the processing flow is interrupted;
   executing, by the execution unit, the recovery processing flow defined by the recovery processing flow information; and
   creating, by the recovery processing flow creation unit, when user authentication for the first user has been completed, the recovery processing flow information as one of the private processing flows for the first user.

6. A non-transitory computer-readable storage medium storing a program executable at least by a computer of an image processing apparatus, the program comprising:
   executing instructions configured to execute a processing flow for sequentially carrying out a plurality of processes, the processing flow being defined by processing flow information including a description representing the plurality of processes;
   display instructions configured to display an operation screen providing a first user with a first option to display indications of private processing flows dedicated to the first user and a second option to display indications of public processing flows generated by at least another user; and
   creating instructions configured to create recovery processing flow information defining a recovery processing flow for carrying out yet-to-be-executed ones of the processes included in the interrupted processing flow, when execution of the processing flow executed according to the executing instructions is interrupted,
   wherein the executing instructions are configured to execute the recovery processing flow defined by the recovery processing flow information, and
   wherein the creating instructions are configured to create, when user authentication for the first user has been completed, the recovery processing flow information as one of the private processing flows for the first user.

* * * * *